United States Patent
Walter et al.

(10) Patent No.: US 7,052,936 B2
(45) Date of Patent: May 30, 2006

(54) USE OF POLYBENZOXAZOLES (PBOS) FOR ADHESION

(75) Inventors: Andreas Walter, Egloffstein (DE); Recai Sezi, Roettenbach (DE)

(73) Assignee: Infineon Technologies AG, Munich (DE)

( * ) Notice: Subject to any disclaimer, the term of this patent is extended or adjusted under 35 U.S.C. 154(b) by 45 days.

(21) Appl. No.: 10/208,397

(22) Filed: Jul. 30, 2002

(65) Prior Publication Data
US 2003/0149207 A1 Aug. 7, 2003

(30) Foreign Application Priority Data
Jul. 31, 2001 (DE) ................ 101 37 375

(51) Int. Cl.
H01L 21/44 (2006.01)
H01L 21/48 (2006.01)
H01L 21/50 (2006.01)

(52) U.S. Cl. ............... 438/118; 438/628; 438/644; 438/654; 438/623; 438/780

(58) Field of Classification Search ........ 438/118, 438/628, 644, 654, 780, 623; 257/759, 783
See application file for complete search history.

(56) References Cited

U.S. PATENT DOCUMENTS

| 3,883,610 | A | * | 5/1975 | Odier | ............ 525/429 |
|---|---|---|---|---|---|
| 5,021,580 | A | * | 6/1991 | Lysenko | ............ 546/307 |
| 5,077,378 | A | * | 12/1991 | Mueller et al. | ............ 528/185 |
| 5,130,194 | A | * | 7/1992 | Baker et al. | ............ 428/367 |
| 5,843,259 | A | * | 12/1998 | Narang et al. | ............ 156/151 |
| 6,120,970 | A | * | 9/2000 | Sezi et al. | ............ 430/192 |
| 6,124,372 | A | * | 9/2000 | Smith et al. | ............ 522/35 |
| 6,151,042 | A | * | 11/2000 | Smith et al. | ............ 347/20 |
| 6,153,350 | A | * | 11/2000 | Sezi et al. | ............ 430/192 |
| 6,183,069 | B1 | * | 2/2001 | Burke et al. | ............ 347/65 |
| 6,204,565 | B1 |  | 3/2001 | Shimoto et al. |  |

FOREIGN PATENT DOCUMENTS

EP 0 807 852 B1 3/2001
JP 10162091 12/1999

OTHER PUBLICATIONS

T. Banba et al. "Positive Working Photosensitive Polymers for Semiconductor Surface Coating", 1991, IEEE, pp. 564-567.*
Ammann et al. "Multichip Packaging in QFPs by PBO-Multilayer High Density Interconnect", 1998, IEEE, pp. 29-34.*

* cited by examiner

*Primary Examiner*—Maria F. Guerrero
(74) *Attorney, Agent, or Firm*—Jenkins, Wilson & Taylor, P.A.

(57) ABSTRACT

The present invention describes the use of polybenzoxazoles (PBOs) for adhesively bonding articles or materials, especially components used in the semiconductor industry, such as chips and wafers, a process for adhesively bonding materials, especially chips and wafers, chip and/or wafer stacks produced by the process, and adhesive compositions which comprise the polybenzoxazoles of the formula (I).

24 Claims, 1 Drawing Sheet a)

b)

c)

d)

e)

USE OF POLYBENZOXAZOLES (PBOS) FOR ADHESION

TECHNICAL FIELD

The present invention describes the use of polybenzoxazoles (PBOs) for adhesively bonding articles or materials, especially components used in the semiconductor industry, such as chips and wafers, a process for adhesively bonding materials, especially chips and wafers, chip and/or wafer stacks produced by the process, and adhesive compositions which comprise the polybenzoxazoles of the formula (I).

BACKGROUND ART

There is an increasing requirement for high-grade adhesives especially in electronics and microelectronics, mechanical engineering, automotive engineering, and also aerospace. In many cases the critical factor is that these adhesives must withstand the extremely high thermal and chemical loads without loss of bond strength or of physical properties. It is also important that they absorb very little water, if any, since water absorption may lead at low temperatures to stresses and cracks, and at high temperatures gives rise to blistering.

The application and testing temperatures here may amount, for example, to between −80° C. to +450° C. Particularly in microelectronics (processes at up to 450° C.) and automotive engineering (adhesive bonds directly in the engine or transmission area), very high temperatures occur. Adhesive bonds in the area of microelectronics, chemical plant, and in the engine area necessitate very high stability of the adhesives toward solvents, acids, bases and/or aggressive gases. At the present time there is a lack in particular of adhesives which meet the requirements specified above and which are highly suitable for bonding a variety of materials, such as silicon, metal, glass, stone and/or ceramic.

In the field of microelectronics and the semiconductor industry the stacking of chips (ICs, integrated circuits) is significant owing, for example, to the increase in memory capacity, since through stacking it is possible to raise the memory capacity without increasing the area of the chip. The stacking technique is especially significant for the combination of different chips; for example, of memory chips and logic chips. Thus during the processing of the silicon wafer it is possible to carry out cost-effective production of only one kind of chips, which are later stacked atop one another and electrically contacted.

In accordance with the state of the art, materials, including chips and/or wafers, are adhesively bonded, for example, by using polyimide adhesives (C. Feger, M. M. Khojasteh, J. E. McGrath, Polyimides: Materials, Chemistry and Characterization, Elsevier Science Publishers B. V., Amsterdam, 1989, p. 151 ff.). Although the polyimides exhibit good temperature stability, the presence of the keto groups means that they absorb a relatively large amount of water, leading to the problems referred to above. Moreover, the adhesion of polyimides to many materials used in particular in microelectronics and optoelectronics is poor.

In the field of microelectronics, polyimides have been used, for example, as follows:

A polyimide is applied to the first wafer, dried, and baked in an oven at about 400° C. The surface of the polyimide layer is then activated in a plasma (argon, oxygen). This wafer is then bonded with a second, likewise plasma-activated, wafer, with the activated sides facing one another. The second wafer can, but need not necessarily, have a polyimide layer. The great disadvantage of this process is that the bonding must be performed within about one hour following activation, since otherwise the surfaces become deactivated. Moreover, owing to the presence of the carbonyl groups, polyimide may absorb water, which may lead to blistering later on when the stack is subjected to temperature. This greatly restricts the usefulness of the process. For chip-on-wafer applications it is practically impossible to employ this process, since in general up to three hours may be needed for the bonding of the chips to a wafer, especially in the case of 200 nm and 300 nm wafers.

EP 807 852 B1 discloses compositions which comprise polyhydroxy amides, a diazoquinone compound, and a phenolic compound and/or an organosilicon compound. In the tests which were carried out here, the adhesiveness fell substantially when the phenol compound or organosilicon compound was removed from the composition or was not present in the amounts stated. Polyhydroxy amide compounds have the disadvantage that, when used as adhesives, in the course of the cyclization to polybenzoxazoles that takes place when they are so used, they eliminate water, which makes the adhesive bonding of relatively large areas more difficult.

Japanese laid-open specification JP 11354591 A (abstract) discloses a photosensitive adhesive for the semiconductor industry, which may comprise polybenzoxazoles.

The operation of chip and/or wafer bonding requires a highly temperature-resistant and chemical-resistant adhesive bond, since a stack of this kind and hence the adhesive may come into contact with aggressive solvents and gases. Moreover, the temperatures are frequently up to 450° C., in the case of tungsten CVD depositions, for example. The adhesive used must absorb very little water, if any, since otherwise there will be blistering at high temperatures and it may in some cases not be possible to produce the contacts reliably.

SUMMARY OF THE INVENTION

One objective of the present invention is to provide a facility for the reliable and permanent adhesive bonding of identical or different materials which are subjected to high thermal and chemical loads.

A further objective of the present invention is to provide permanent, chemical-stable and temperature-stable adhesive bonds between wafers and/or chips.

The present invention relates according to claim 1 to the use of polybenzoxazoles (PBOs) of the following general formula (I) for adhesive bonding:

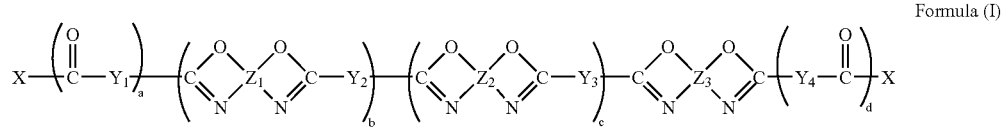

Formula (I)

where a=0 or 1, b=0–100, c=0–100 and d=0 or 1, where a=d;

X, if a and d=0, is: —H, alkyl, alkenyl, cycloalkenyl, aryl, aralkyl, aralkenyl, aralkynyl or heterocycloalkyl each unsubstituted or substituted;

X, if a and d=1, is: hydroxy, substituted or unsubstituted alkoxy, alkenoxy, aryloxy, cycloalkenoxy, amino, alkylamino, alkenylamino, arylamino, arylalkenoxy, arylalkylamino;

$Y_1$ to $Y_4$ independently of one another have the following definition: substituted or unsubstituted aryl, a substituted or unsubstituted polynuclear aromatic hydrocarbon compound, a substituted or unsubstituted fused ring system, or alkyl, alkenyl, alkynyl, aralkyl, aralkenyl, aralkynyl, heterocyclo or cycloalkenyl each unsubstituted or substituted;

$Z_1$ to $Z_3$ independently of one another have the following definition: aryl, aralkyl, aralkenyl, aralkynyl, heteroaryl, a polynuclear aromatic hydrocarbon compound or a fused ring system each unsubstituted or substituted.

The present invention further relates to a process for adhesively bonding materials or components, wherein:

a) polybenzoxazoles of the present invention are applied to the area or areas of the materials or components to be bonded;

b) the areas to be bonded are contacted with one another;

c) subsequently the polybenzoxazoles are crosslinked, and d) then, optionally, baking takes place.

The invention further embraces articles and components which have been adhesively bonded by the process of the invention.

The present invention also relates to an adhesive composition comprising:

5–40% by weight of PBOs of the general formula (I),

60–95% by weight of an organic solvent, and optionally 0.1–10% by weight of a crosslinker.

DETAILED DESCRIPTION OF THE INVENTION

In accordance with the invention the PBOs of the formula (I) can be used for adhesively bonding materials and/or components, particular preference being given to their use for bonding chips and/or wafers and, in general, articles or materials which are used in microelectronics and optoelectronics. Particularly preferred among the compounds of the formula (I) are the following compounds:

those compounds wherein b=1–20 and/or c=0–20, with further preference c=1–15.

Also preferred are:

compounds where X, if a and d=0, is:

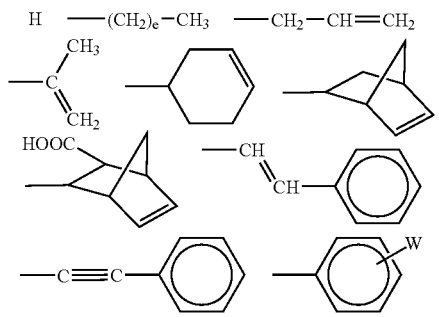

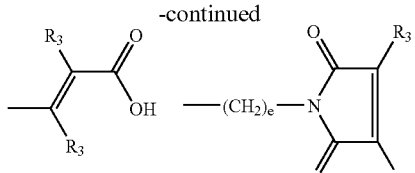

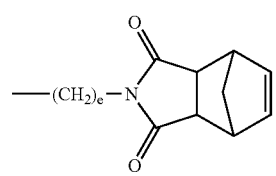

where e=0–10;

$R_3$ is: —H, and also:

—(CH$_2$)$_k$—CH$_3$  (k = 0–10)    —(CF$_2$)$_k$—CF$_3$  (k = 0–10)

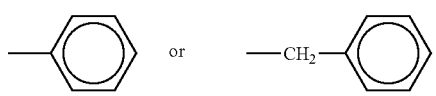

W is:

—H    —CN    —CH(CH$_3$)$_2$    —C(CH$_3$)$_3$
—(CH$_2$)$_e$—CH$_3$    —(CF$_2$)$_e$—CF$_3$
—Q—(CH$_2$)$_e$—CH$_3$    —Q—(CF$_2$)$_e$—CF$_3$
—Q—CH$_2$—CH=CH$_2$    —CH=CH$_2$    —C≡CH

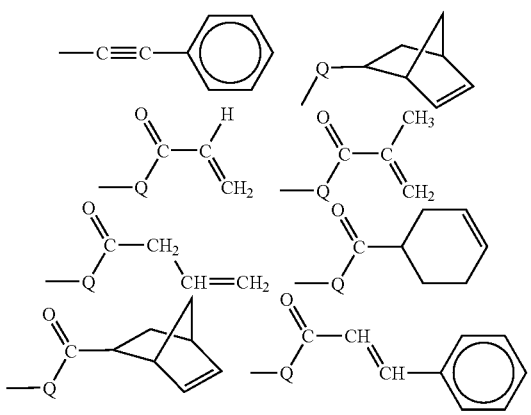

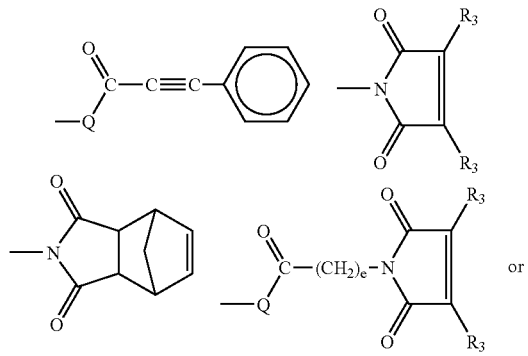

-continued
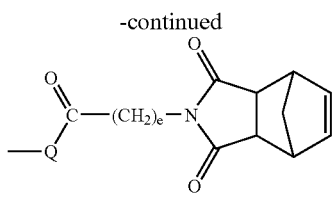
where e=0–10;
and Q is: —O—, —S— or —NH—.
If a and d=1, X is preferably:
—OH    —O—(CH$_2$)$_e$—CH$_3$    —O—CH$_2$—CH═CH$_2$
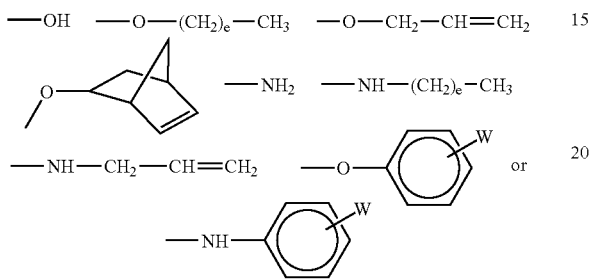
—NH$_2$    —NH—(CH$_2$)$_e$—CH$_3$
—NH—CH$_2$—CH═CH$_2$    —O—⌬—W    or
—NH—⌬—W
where e=0–10;
and W is as defined above.
Compounds wherein $Y_1$ to $Y_4$ independently of one another are:
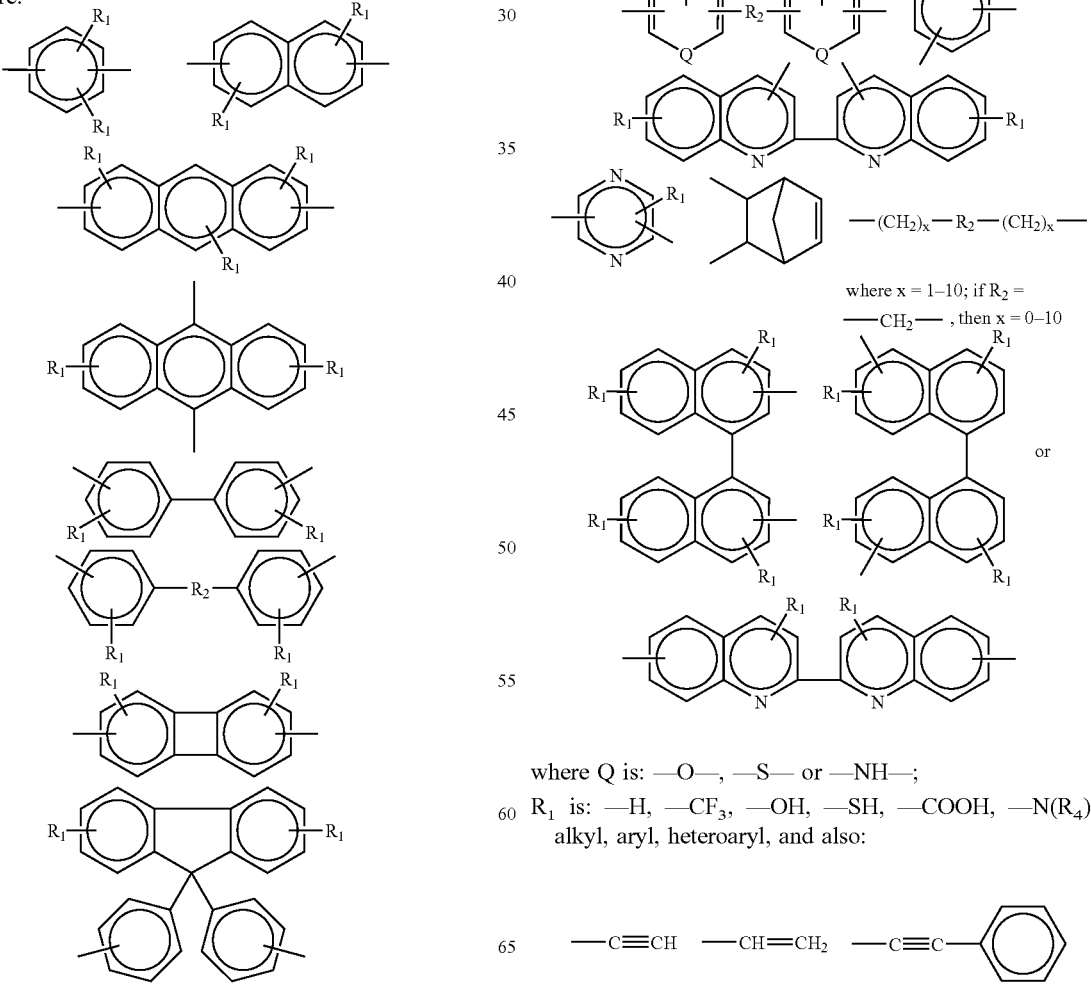
where Q is: —O—, —S— or —NH—;
$R_1$ is: —H, —CF$_3$, —OH, —SH, —COOH, —N(R$_4$)$_2$, alkyl, aryl, heteroaryl, and also:
—C≡CH    —CH═CH$_2$    —C≡C—⌬

-continued

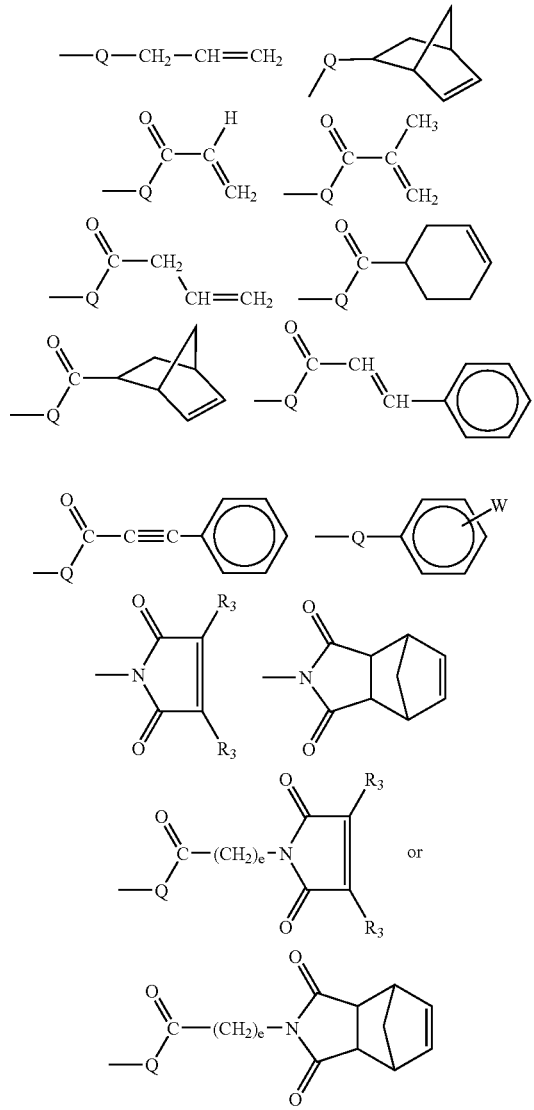

where e=0–10;
Q is: —O—, —S— or —NH—;
$R_2$ is: —O—, —CO—, —$NR_3$—, —S—, —$SO_2$—, —$S_2$—, —$CH_2$—, or:

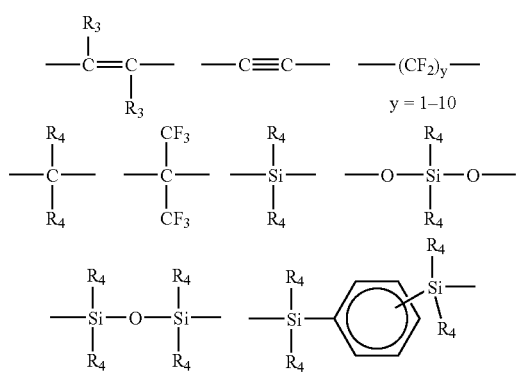

-continued

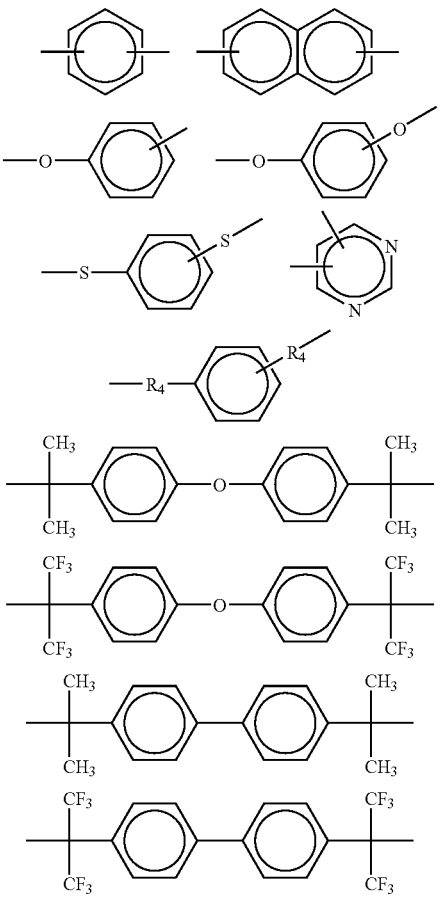

and $R_3$ is: —H, and also:

—$(CH_2)_k$—$CH_3$ (k=0–10)   —$(CH_2)_k$—$CF_3$ (k=0–10)

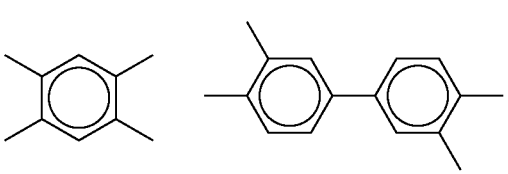

where $R_4$ is: alkyl having from 1 to 10 carbon atoms, aryl or heteroaryl, are also preferred.

Suitable examples of polynuclear aromatic hydrocarbon radicals, fused ring systems, and heterocyclic compounds for $Y_1$ to $Y_4$ are biphenyl, anthracene, naphthalene, fluorene, pyrene, thiophene, thiazole or benzothiazole, imidazole or benzimidazole, pyrrole, furan, pyridine or pyrazine or derivatives thereof.

Compounds wherein $Z_1$ to $Z_3$ independently of one another are:

-continued

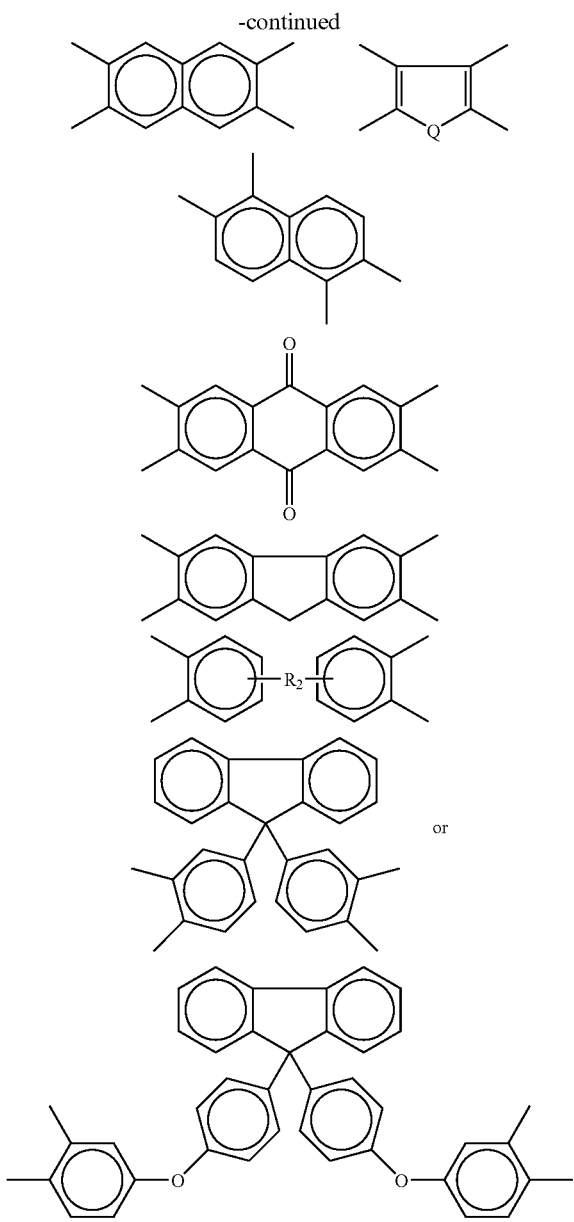

where Q is: —O—, —S— or —NH—;
and $R_2$ is as defined above, are also preferred.

Suitable examples of polynuclear aromatic hydrocarbon radicals, fused ring systems, and heterocyclic compounds for $Z_1$ to $Z_3$ are biphenyl, anthracene, naphthalene, fluorene, pyrene, thiophene, thiazole or benzothiazole, imidazole or benzimidazole, pyrrole, furan, pyridine or pyrazine or derivatives thereof.

Particularly preferred radicals for $Z_1$, $Z_2$ and/or $Z_3$ are:

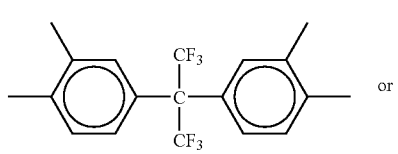

-continued

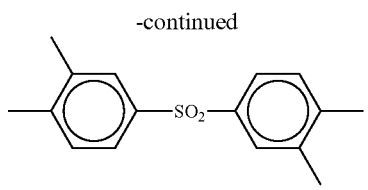

Particular preference is further given to compounds wherein $Y_1$, $Y_2$, $Y_3$ and/or $Y_4$ are:

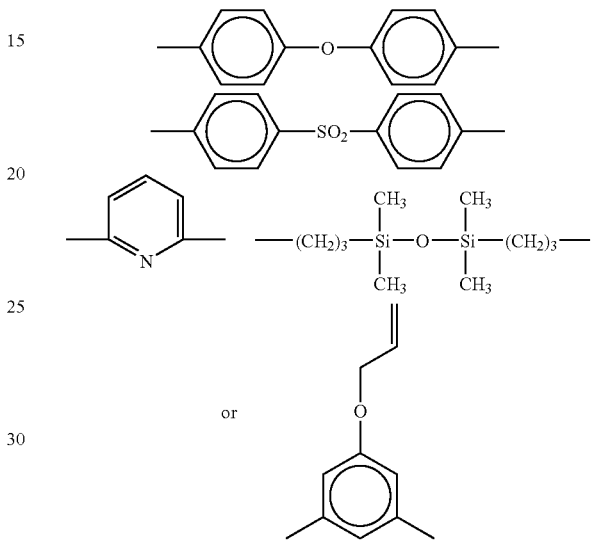

It is preferred for the polybenzoxazoles of the present invention to contain no constituents other than solvents and/or crosslinker substances. In particular, the polybenzoxazoles of the present invention preferably do not include the following constituents which are mandatorily present in the composition according to EP 807 852 B1: (B), i.e., photosensitive diazoquinone compounds, (C), i.e., the phenolic compounds specified therein, and (D), i.e., the organosilicon compounds specified therein. It is preferred to use a composition which consists of the polybenzoxazoles described in accordance with the invention, an appropriate solvent, and, optionally, crosslinker substances.

The polybenzoxazoles used in the present invention have the advantage, when used as adhesives, that they no longer eliminate water, such as polyhydroxy amides do, for example, which frequently form a precursor to polybenzoxazoles, and are cyclized by thermal exposure to polybenzoxazoles. In contrast, in the present invention, polybenzoxazoles prepared directly in solution are used. This makes it possible to bond relatively large areas, which is relatively difficult when using polyhydroxy amides, owing to the water they release during the bonding process. It is not envisaged in accordance with the invention to use polyhydroxy amides for bonding which could be converted by cyclization to polybenzoxazoles of the general formula (I).

The polybenzoxazoles of the present invention can be prepared by reacting a bisphenol for introducing the group $Z_1$, $Z_2$ and/or $Z_3$, preferably in the presence of phosphorus pentoxide, with a dicarboxylic acid for introducing the group(s) $Y_1$, $Y_2$, $Y_3$ and/or $Y_4$. This is followed by a reaction with a compound for introducing the terminal group X, in the form for example of an X-carbonyl chloride or of an anhydride. The preparation takes place preferably in Eaton's reagent, i.e., a solution of 7.5% by weight phosphorus pentoxide in methanesulfonic acid, or, likewise preferably, generally in the presence of phosphorus pentoxide in an appropriate solvent, such as methanesulfonic acid, N-methylpyrrolidone, dimethylacetamide, dimethylsulfoxide, γ-butyrolactone, polyphosphoric acid, a mixture of sulfuric acid and phosphoric acid, and mixtures of these solvents. In this variant of the process the solvent is in a mixture with phosphorus pentoxide, preferably with 5–10% by weight phosphorus pentoxide, more preferably 7–8% by weight, based on the composition comprising solvent and phosphorus pentoxide. The reaction takes place preferably under inert gas, dry nitrogen for example.

The polybenzoxazoles of the present invention can be used with preference for permanent bonding of the following materials and/or articles or articles with surfaces of the following materials: aluminum, titanium, vanadium, chromium, manganese, iron, cobalt, nickel, copper, zinc, steel, brass, palladium, silver, tin, tantalum, tungsten, platinum, gold, lead, carbon, including layers containing carbon and deposited by means of plasma, carbon fibers, silicon or germanium.

Further-preferred materials are alloys of the abovementioned materials and compounds of the abovementioned materials with oxygen and/or nitrogen, especially silicon carbide, silicon nitride, silicon oxide, titanium nitride, tantalum nitride, silicon oxynitride, tungsten nitride, gallium arsenide, gallium nitride, gallium indium phosphite, indium-tin oxide. Fundamentally, particular preference is given in accordance with the invention to adhesively bonding those compounds which are employed in microelectronics and optoelectronics.

Further materials suitable for adhesive bonding in accordance with the invention include ceramics, glass ceramics, glasses, clayware, porcelain, stoneware and/or silicates. Glasses which can be used with preference include quartz glass, soda glass, potassium glass, soda-potassium-lime glass, boron-alumina glass, borosilicate glass, and potassium-lead glass. Enamel can likewise be bonded with preference in accordance with the invention.

Furthermore, various minerals, such as marble, basalt, limestone, granite, and concrete, can be bonded with preference in accordance with the invention.

All of said materials can be adhesively bonded to themselves or to another of the abovementioned materials.

The parts to be bonded to one another in accordance with the invention withstand temperatures in the range of between –80° C. to 400° C., in the majority of cases up to 450° C., without any problem of detachment. This is favored by the very low water absorption of the polybenzoxazoles used in accordance with the invention. There is no decrease in bond strength following multiple exposure within this temperature range. Additionally, following the action of solvents, chemicals or aggressive gases on the bonded parts, including the adhesive, the bond strength is not substantially impaired. It is a particular advantage of the present invention that the class of adhesives defined according to the invention, namely polybenzoxazoles of the general formula (I), can be used universally for the permanent and reliable adhesive bonding of a variety of materials, with the bonds being extremely stable toward temperature and chemical exposures.

The present invention is especially suitable for the adhesive bonding of chips and/or wafers. This is carried out with the aim of stacking chips (integrated circuits), since this makes it possible to increase the memory capacity without increasing the area of the chip. Its stacking technique is particularly significant, however, for the combination of different chips; for example, of memory chips and logic chips. During the processing of the silicon wafer it is possible, for instance, to carry out cost-effective production of one kind of chips which are subsequently stacked atop one another and electrically contacted.

In accordance with the invention, the stacking can be done either by stacking wafers on wafers or by stacking chips on wafers. In each case, when processing is at an end, the individual stacks require separation from one another, by sawing, for example.

Stacking takes place in accordance with the invention by means of bonding with the polybenzoxazoles of the invention. Bonding with these high temperature stable, permanent adhesives of the invention has the advantage that these adhesives can be processed by the technique of spincoating, which is a standard operation in microelectronics. Spincoating and bonding may be followed without problems by other clean-room operations such as sputtering or etching. In accordance with the state of the art, stacking is frequently accomplished by means of soldering. In this case, however, the implementation of downstream processes is no longer possible in a "clean room", since the soldering operation is cleanroom-incompatible.

The present invention also relates to a process for adhesively bonding materials and components. In principle the process comprises the steps of:
  applying polybenzoxazoles of the present invention to the area or areas of the materials or components to be bonded;
  contacting the areas to be bonded with one another, and subsequently crosslinking, for example by means of temperature treatment, laser treatment, ultrasound treatment or microwave treatment, with temperature treatment being preferred;
  and optionally then baking again.

Crosslinking takes place, in accordance with the invention, presumably with the participation of the terminal groups X.

The temperature treatment for crosslinking takes place preferably at a temperature of 300–400° C., with further preference 300–360° C., for 20–120 min, preferably 40–80 min.

Contacting of the areas takes place preferably under an applied pressure of 0.5–10 N/cm$^2$, preferably 4–8 N/cm$^2$.

The optional subsequent baking step takes place preferably at a temperature of 320–420° C., more preferably 350–400° C., for a period of 20–120 min, more preferably 40–80 min.

The polybenzoxazoles of the present invention are applied preferably in the form of a powder to the areas which are to be bonded and the powder is converted by heating into a melt which can be spread over the surface.

In accordance with a further, preferred embodiment the polybenzoxazoles of the present invention may be applied as a melt, or in solution in an organic solvent, to the surface or area that is to be bonded, by spincoating techniques, spraying or spreading or brushing. In the case of solvent-based systems, drying is advantageous, and in many cases is also necessary.

Examples of suitable solvents for the polybenzoxazoles of the invention include N-methylpyrrolidone, γ-butyrolactone, ethyl lactate, cyclohexanone or diethylene glycol monomethyl ether or mixtures thereof. The PBOs are preferably in a concentration of 5–40% by weight, more preferably 15–30% by weight, based on the overall composition; the solvent is preferably in a concentration of 60–95% by weight, more preferably 70–85% by weight. By means of the PBO content it is possible to control the viscosity of the composition.

polycondensation. As crosslinkers it is possible to employ crosslinkers which are known in the state of the art. With preference, in accordance with the invention, the following compounds [lacuna] as crosslinkers:

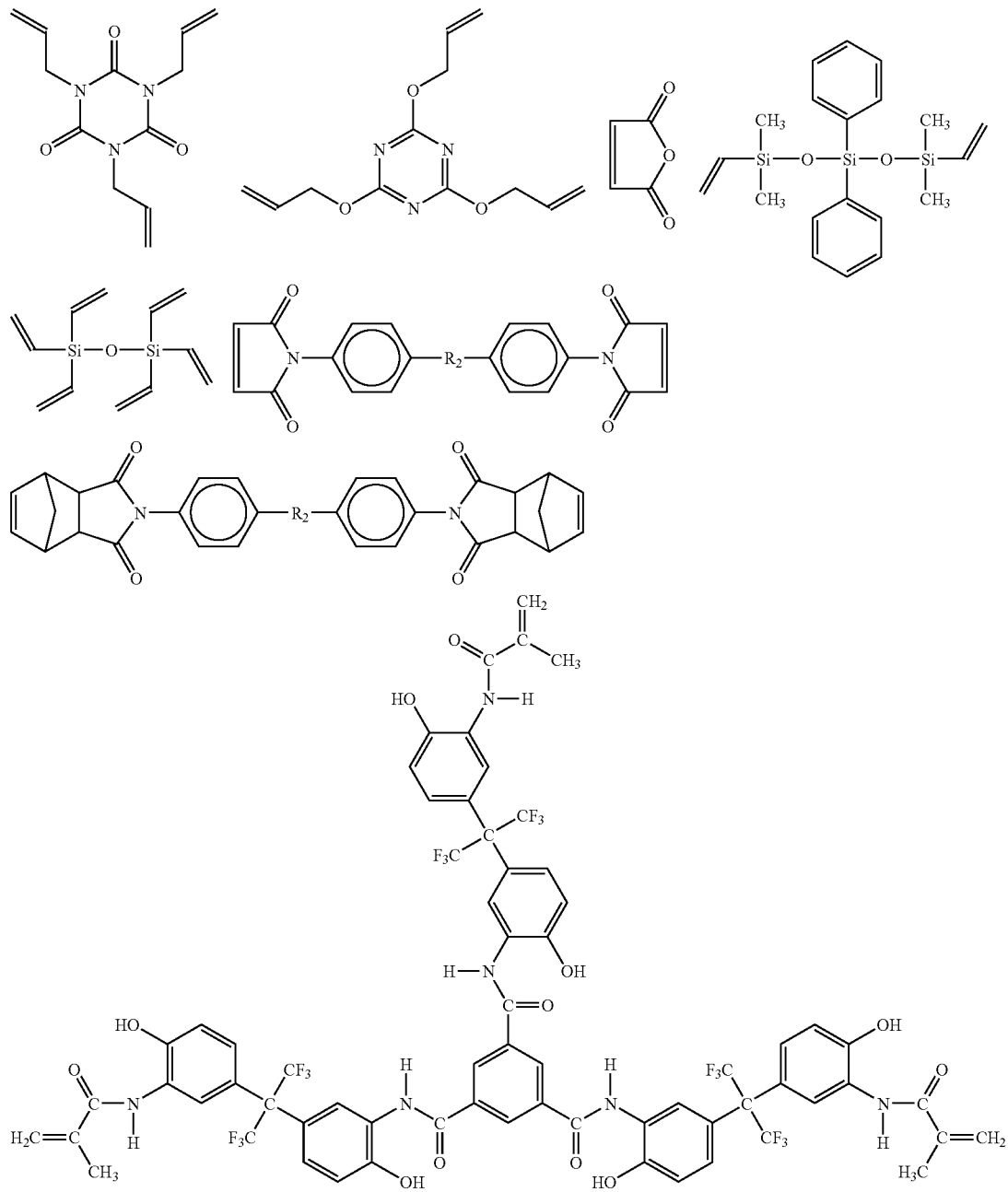

The solution of polybenzoxazoles and organic solvent may contain, based on overall composition, 0.1–10% by weight, preferably 0.5–5% by weight, of a crosslinker. By using crosslinkers it is possible to exert a positive influence over the cure behavior, strength, and thermal and chemical stability of the polybenzoxazoles. Crosslinkers which can be used in this context include short-chain compounds containing at least two groups capable of addition polymerization or where $R_2$ is as defined above.

In order to improve the adhesion properties, the (surface) areas to be bonded may be cleaned and/or roughened beforehand by means of plasma, solvent, sandblasting, flaming or brushing or other mechanical abrasion techniques. Dust residues can be removed, for example, by blowing with compressed air or washing in water.

In order to remove residues of oils and fats or other impurities, the components to be bonded may be treated with solvents such as acetone, alcohols, halogenated hydrocarbons or aromatic hydrocarbons.

It is further preferable, before applying polybenzoxazole, to apply an adhesion promoter to at least one of the areas to be bonded. By using adhesion promoters it is possible to enhance the wetting of the surface to be bonded and thus the adhesion of the polybenzoxazoles to the surfaces relevant in microelectronics, such as silicon, silicon oxide, silicon nitride, tantalum nitride, glass or quartz, for example.

Adhesion promoters which are particularly suitable in accordance with the invention are silanes containing at least one alkoxy group. Preference is given to N-(2-aminoethyl)-3-aminopropylmethyldimethoxysilane; 3-aminopropylmethyl-diethoxysilane; 3-(N-allylamino)propyltrimethoxysilane or (3-acryloyloxypropyl)trimethoxysilane (see formulae).

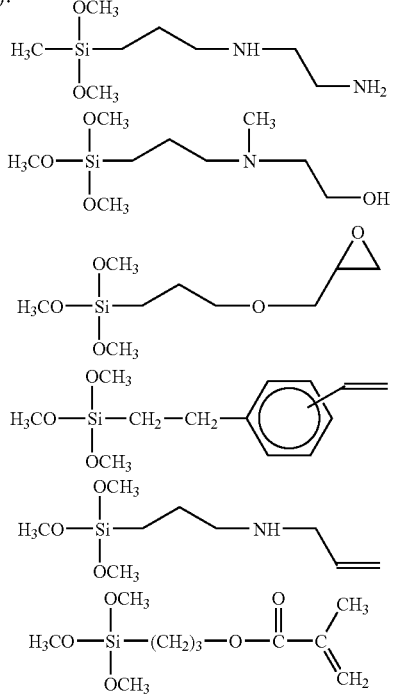

It is preferred to apply the adhesion promoter to one of the areas to be bonded and the polybenzoxazoles to the other of the areas to be bonded.

It is also possible in accordance with the invention, however, first to apply an adhesion promoter to both areas and then to apply the polybenzoxazoles to one or both of the areas to be bonded.

The adhesion promoter is preferably applied to the area to be bonded in a substantially monomolecular layer. The adhesion promoters are normally dissolved with a concentration of approximately 0.5% by weight in a mixture of methanol, ethanol or isopropanol with approximately 95% by weight and 5% by weight of fully deionized water, and used further in this form.

The adhesion promoter is preferably applied by spincoating. This technique is known to the skilled worker. The area to be bonded may also be dipped into the solution of the adhesion promoter and subsequently blown dry. The areas treated with the adhesion promoter should be adhesively bonded within two hours.

The process of the present invention is especially suitable for stacking chips and/or wafers with one another and bonding them.

One chip or wafer stacking process which is preferred in accordance with the invention comprises adhesively bonding a base wafer carrying functional chips to a second, thinned wafer, likewise carrying functional chips. In this case the thinned wafer is located on another, unthinned wafer, which only has a carrier function. After the two wafers carrying functional chips have been bonded, the carrier wafer is separated from the stack. This process is depicted in FIG. 1.

First of all, the base wafer 1 is bonded by means of a temporary adhesive 2 to a carrier wafer 3. Subsequently, the wafer 1 is shaped on the carrier wafer 3 into a thinned wafer 4.

Thereafter, a permanent adhesive 5 in accordance with the present invention is applied to the thinned wafer and baked.

This is followed by bonding to the base wafer 6. Finally, the carrier wafer 3 is detached. This separation is carried out by detaching the temporary adhesive layer, under the effect of temperature, for example, which is located between the thinned wafer 4 and the carrier wafer 3. This second adhesive layer differs from the permanent adhesive of the present invention in particular in that it remains meltable and hence soluble following a temperature treatment. FIG. 1a shows the condition after the bonding of the wafer 1 carrying functional chips to the carrier wafer 3. FIG. 1b shows the situation after the thinning of the wafer 1 to give a thinned wafer 4 on the carrier wafer 3. FIG. 1c shows the condition following application and baking of the permanent adhesive 5. FIG. 1d shows the condition after bonding of a wafer 6 carrying functional chips by permanent adhesive 5, and FIG. 1e the condition after removal of the carrier wafer 3.

The chips lying one above the other on the two wafers can then be connected electrically to one another. In this case, it is possible first of all to etch the permanent adhesive, to clean the contact hole with cleaning solutions, and to fill it with a metal, such as tungsten, which can be done by means of a CVD process.

In the case of the chip and/or wafer bonding process of the invention, for example, a first wafer is spincoated with a polybenzoxazole, dried at 80–200° C. and then baked at 300–350° C. The second wafer is either treated in the same way as the first wafer or, more advantageously, is provided only with an adhesion promoter. In many cases it is sufficient for this wafer to have been cleaned with a solvent beforehand and baked at at least 200° C. The two wafers are then bonded to one another at an elevated temperature (200–380° C.). After bonding, the wafers are again baked at 350–420° C. The duration of the bake is 20–60 minutes.

The bonding process of the invention requires no plasma activation or plasma equipment. The adhesive layer is active for a number of hours; in other words, there is no risk of deactivation even in the case of operations which take a very long time. Accordingly, the process is also very suitable for bonding chips to wafers.

The wafers or chips bonded to one another in accordance with the invention have a permanent bond. This bond is unaffected either by high temperatures of up to above 500° C. or by chemicals such as solvents, acids, bases or aggressive gases. This is very significant, because the bonded parts are interrupted in numerous processes such as etching, sputtering, chemical cleaning, etc. A further advantage lies in the fact that the polybenzoxazoles absorb much less water than the polyimides known in the state of the art, and so the risk of blistering, in particular when bonding relatively large surface areas, is much less. The chip stacks and wafer stacks show no stress-related cracks, flakes or creases, which is frequently a problem especially in the case of thinned wafers.

Overall it is a particular advantage of the present invention that by means of the invention it is possible to implement permanent and reliable stacking of wafers and/or chips, with the bonds being extremely stable with respect to temperature and chemical exposures and exhibiting substantially no mechanical defects.

The present invention further embraces articles comprising at least two parts which have been adhesively bonded using polybenzoxazoles of the present invention. The articles in question are preferably bonded chips and/or wafers. These may be bonded to give stacks, which may contain, for example, up to 8, preferably 2–4, chips and/or wafers. Bonded chip and/or wafer stacks of this kind are one preferred embodiment of the present invention.

The present invention further relates to adhesive compositions containing 5–40% by weight, preferably 15–30% by weight, of a polybenzoxazole, 60–95% by weight, preferably 70–85% by weight, of an organic solvent, and 0.1–10% by weight, preferably 0.5–5% by weight, of a crosslinker, in each case based on the overall composition. It is preferred for the composition to contain no other constituents, i.e., to consist of the stated constituents. It is further preferred for the composition to contain no phenol compound additions, particularly not the phenol compounds (C) disclosed as being necessary in EP 807 852 B1. Furthermore, the composition preferably does not contain the organosilicon compounds (D) disclosed alternatively as being necessary in EP 807 852 B1.

The present invention is illustrated below with reference to examples, which are not intended, however, to restrict the scope of the invention.

BRIEF DESCRIPTION OF THE DRAWINGS

In the description, reference is made to the following figures.

FIG. 1*a* shows the condition after the bonding of the wafer 1 carrying functional chips to the carrier wafer 3.

FIG. 1*b* shows the situation after the thinning of the wafer 1 to give a thinned wafer 4 on the carrier wafer 3.

FIG. 1*c* shows the condition following application and baking of the permanent adhesive 5.

FIG. 1*d* shows the condition after bonding of a wafer 6 carrying functional chips by permanent adhesive 5, and FIG. 1*e* the condition after removal of the carrier wafer 3.

DEFINITIONS

Figure 1:
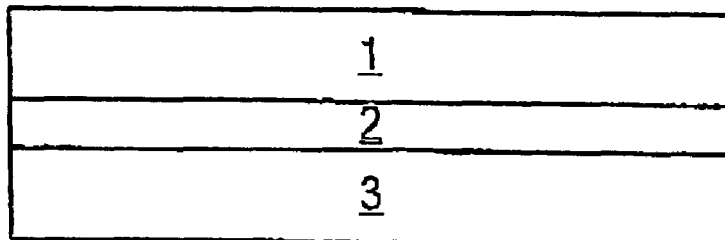
FIG. 1 shows a process of the invention for adhesively bonding wafers.
Figure 1:
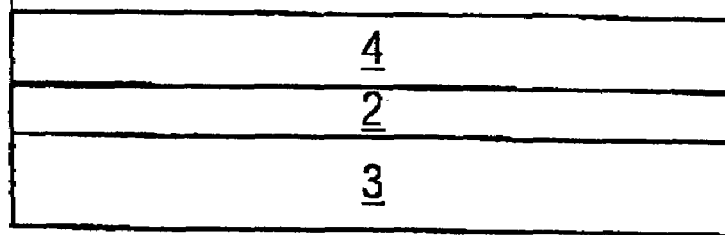
Figure 1:
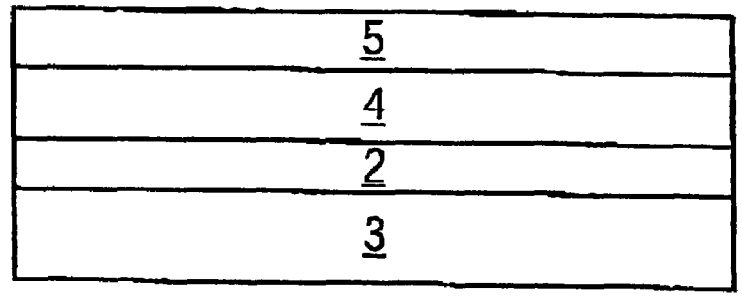
Figure 1:
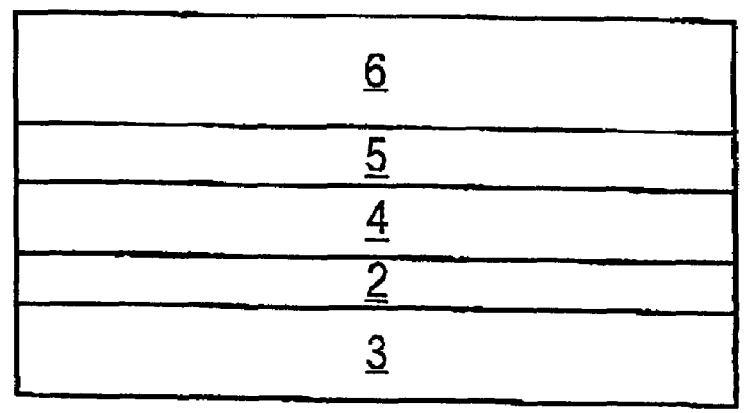
Figure 1:
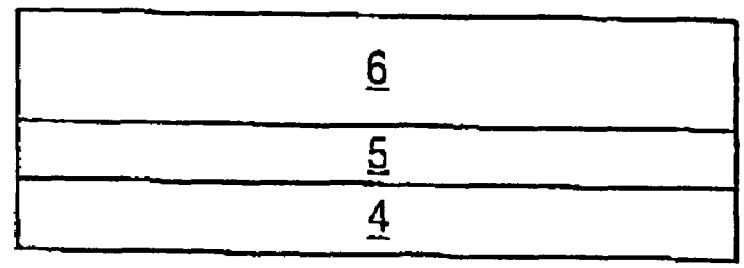

In the context of the present invention the following definitions apply:

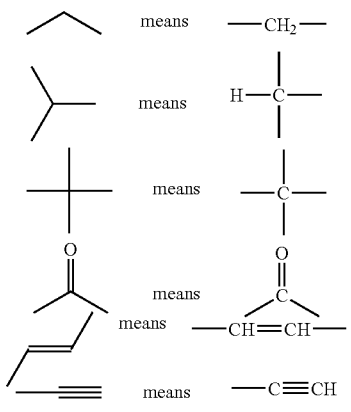

for cyclic, branched, and linear compounds.

EXAMPLES

Chemicals used:
Bisaminophenols:
9,9'-Bis(4-((3-hydroxy-4-amino)phenyloxy)phenyl)fluorene-(bisaminophenol 1)

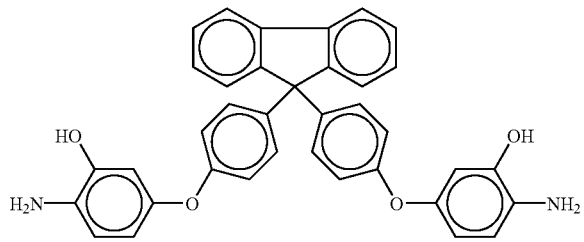

2,2-Bis(3-amino-4-hydroxyphenyl)hexafluoropropane-(bisaminophenol 2)

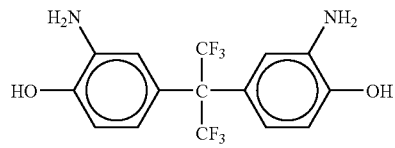

3,3'-Diamino-4,4'-dihydroxybiphenyl-(bisaminophenol 3)

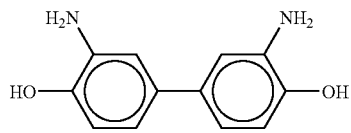

2,2-Bis(3-amino-4-hydroxyphenyl) sulfone-(bisaminophenol 4)

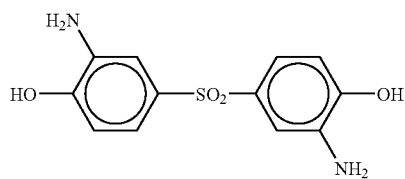

Dicarboxylic acid
Diphenyl ether 4,4'-dicarboxylic acid-(dicarboxylic acid 1)

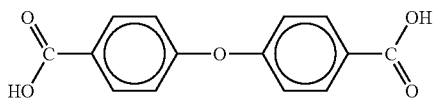

Diphenyl sulfone 4,4'-dicarboxylic acid-(dicarboxylic acid 2)

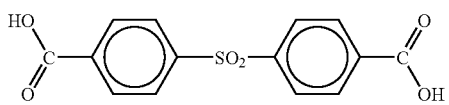

Pyridine-2,6-dicarboxylic acid-(dicarboxylic acid 3)

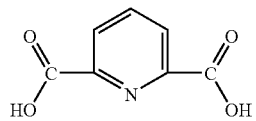

Isophthalic acid-(dicarboxylic aid 4)

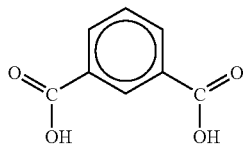

Diphenyl-4,4'-dicarboxylic acid-(dicarboxylic acid 5)

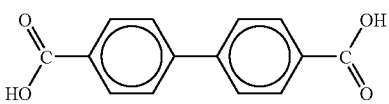

1,3-Bis(3-carboxypropyl)tetramethyldisiloxane-(dicarboxylic acid 6)

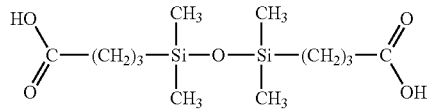

5-Allyloxyisophthalic acid-(dicarboxylic acid 7)

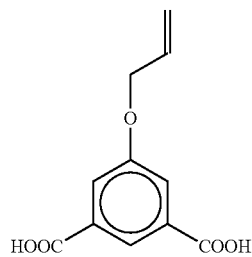

Endcap
Methacrylic acid-(endcap 1)

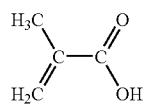

Acrylic acid-(endcap 2)

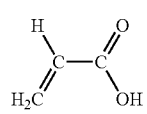

5-Norbornene-2-carboxylic acid-(endcap 3)

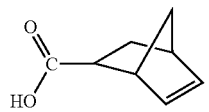

5-Norbornene-2,3-dicarboxylic anhydride-(endcap 4)

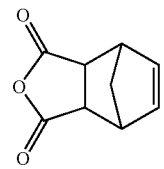

Maleic anhydride-(endcap 5)

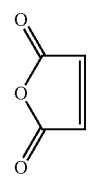

Eaton's reagent: solution of 7.5% by weight of phosphorus (V) oxide in methanesulfonic acid All polymer syntheses are carried out under dry nitrogen as inert gas.

Example 1

Polybenzoxazole 1

169.38 g (0.3 mol) of bisaminophenol 1 are dissolved in 800 ml of Eaton's reagent. Added dropwise to this solution at room temperature with stirring is a solution of 61.93 g (0.24 mol) of dicarboxylic acid 1 in 400 ml of Eaton's reagent. The mixture is heated at 80° C. with stirring for 5 hours. At 40° C., 10.32 g (0.12 mol) of endcap 1 in solution in 100 ml of Eaton's reagent are added dropwise to the reaction mixture. The mixture is subsequently heated at 100° C. with stirring for 6 hours.

To isolate the polymer the reaction mixture is filtered through a glass frit and the filtrate is introduced dropwise with stirring and ice cooling into a mixture of 2 l of deionized (DI) water, 2 kg of ice and 200 ml of concentrated ammonia, with further concentrated ammonia being added during the dropwise introduction so that the pH did not fall below 8. During the dropwise introduction the temperature should not rise above 30° C. The precipitated polymer is filtered off with suction and washed with 3 l of cold DI water. Following suction filtration, the polymer is stirred once in 3 l of a 3% strength ammonia solution at room temperature for 1 hour and then filtered off with suction. The polymer is washed neutral by suspending it repeatedly in DI water, then is filtered off and dried for 72 hours at 50° C./10 mbar. The yield is 219 g.

The polybenzoxazole prepared in this way is soluble in solvents such as NMP, γ-butyrolactone, ethyl lactate, cyclohexanone, diethylene glycol monomethyl ether.

Example 2

Polybenzoxazole 2

109.88 g (0.3 mol) of bisaminophenol 2 are dissolved in 700 ml of Eaton's reagent. Added dropwise to this solution at room temperature with stirring is a solution of 61.93 g (0.24 mol) of dicarboxylic acid 1 in 400 ml of Eaton's reagent. The mixture is heated at 80° C. with stirring for 5 hours. At 40° C., 10.32 g (0.12 mol) of endcap 1 in solution in 100 ml of Eaton's reagent are added dropwise to the reaction mixture. The mixture is subsequently heated at 100° C. with stirring for 6 hours.

Polybenzoxazole 2 is worked up as in example 1. Yield: 152 g.

Example 3

Polybenzoxazole 3

109.88 g (0.3 mol) of bisaminophenol 2 are dissolved in 700 ml of Eaton's reagent. Added dropwise to this solution at room temperature with stirring is a solution of 73.44 g (0.24 mol) of dicarboxylic acid 2 in 500 ml of Eaton's reagent. The mixture is heated at 80° C. with stirring for 5 hours. At 40° C., 8.64 g (0.12 mol) of endcap 2 in solution in 80 ml of Eaton's reagent are added dropwise to the reaction mixture. The mixture is subsequently heated at 100° C. with stirring for 6 hours.

Polybenzoxazole 3 is worked up as in example 1. Yield: 163 g.

Example 4

Polybenzoxazole 4

64.87 g (0.3 mol) of bisaminophenol 3 are dissolved in 600 ml of Eaton's reagent. Added dropwise to this solution at room temperature with stirring is a solution of 40.08 g (0.24 mol) of dicarboxylic acid 3 in 300 ml of Eaton's reagent. The mixture is heated at 80° C. with stirring for 5 hours. At 40° C., 16.57 g (0.12 mol) of endcap 3 in solution in 150 ml of Eaton's reagent are added dropwise to the reaction mixture. The mixture is subsequently heated at 100° C. with stirring for 6 hours.

Polybenzoxazole 4 is worked up as in example 1. Yield: 99.4 g.

Example 5

Polybenzoxazole 5

84.01 g (0.3 mol) of bisaminophenol 4 are dissolved in 700 ml of Eaton's reagent. Added dropwise to this solution at room temperature with stirring is a solution of 29.88 g (0.18 mol) of dicarboxylic acid 4 in 250 ml of Eaton's reagent. The mixture is heated at 80° C. with stirring for 5 hours. At 40° C., 29.55 g (0.18 mol) of endcap 4 in solution in 250 ml of Eaton's reagent are added dropwise to the reaction mixture. The mixture is subsequently heated at 100° C. with stirring for 6 hours.

Polybenzoxazole 5 is worked up as in example 1. Yield: 121 g.

Example 6

Polybenzoxazole 6

84.09 g (0.3 mol) of bisaminophenol 2 are dissolved in 600 ml of Eaton's reagent. Added dropwise to this solution at room temperature with stirring is a solution of 58.09 g (0.24 mol) of dicarboxylic acid 5 in 400 ml of Eaton's reagent. The mixture is heated at 80° C. with stirring for 5 hours. At 40° C., 11.76 g (0.12 mol) of endcap 5 in solution in 150 ml of Eaton's reagent are added dropwise to the reaction mixture. The mixture is subsequently heated at 100° C. with stirring for 6 hours.

Polybenzoxazole 6 is worked up as in example 1. Yield: 123 g.

Example 7

Polybenzoxazole 7

84.09 g (0.3 mol) of bisaminophenol 2 are dissolved in 600 ml of Eaton's reagent. Added dropwise to this solution at room temperature with stirring is a solution of 91.84 g (0.3 mol) of dicarboxylic acid 6 in 600 ml of Eaton's reagent. The mixture is heated at 100° C. with stirring for 10 hours.

Polybenzoxazole 7 is worked up as in example 1. Yield: 164 g.

Example 8

Polybenzoxazole 8

84.7 g (0.15 mol) of bisaminophenol 1 are dissolved in 600 ml of Eaton's reagent. Added dropwise to this solution at room temperature with stirring is a solution of 26.64 g (0.12 mol) of dicarboxylic acid 7 in 400 ml of Eaton's reagent. The mixture is heated at 80° C. with stirring for 5 hours. At 40° C., 5.16 g (0.06 mol) of endcap 1 in solution in 50 ml of Eaton's reagent are added dropwise to the reaction mixture. The mixture is subsequently heated at 100° C. with stirring for 6 hours.

Polybenzoxazole 8 is worked up as in example 1. Yield: 106 g.

Example 9

Polybenzoxazole 9

84.09 g (0.3 mol) of bisaminophenol 2 are dissolved in 600 ml of Eaton's reagent. Added dropwise to this solution at room temperature with stirring is a solution of 73.47 g (0.24 mol) of dicarboxylic acid 6 in 600 ml of Eaton's reagent. The mixture is heated at 80° C. with stirring for 5 hours. At 40° C., 6.27 g (0.06 mol) of endcap 1 in solution in 50 ml of Eaton's reagent are added dropwise to the reaction mixture. The mixture is subsequently heated at 100° C. with stirring for 6 hours.

Polybenzoxazole 9 is worked up as in example 1. Yield: 144 g.

Example 10

Polybenzoxazole 10

73.25 g (0.2 mol) of bisaminophenol 2 are dissolved in 600 ml of Eaton's reagent. Added dropwise to this solution at room temperature with stirring is a solution of 30.6 g (0.1 mol) of dicarboxylic acid 2 in 300 ml of Eaton's reagent. The mixture is heated at 80° C. with stirring for 5 hours. At 40° C., 17.21 g (0.2 mol) of endcap 1 in solution in 100 ml of Eaton's reagent are added dropwise to the reaction mixture. The mixture is subsequently heated at 100° C. with stirring for 6 hours.

Polybenzoxazole 10 is worked up as in example 1. Yield: 92 g.

Example 11

Polybenzoxazole 11

169.4 g (0.3 mol) of bisaminophenol 1 are dissolved in 600 ml of Eaton's reagent. Added dropwise to this solution at room temperature with stirring is a solution of 91.84 g (0.3 mol) of dicarboxylic acid 6 in 600 ml of Eaton's reagent. The mixture is heated at 100° C. with stirring for 10 hours.

Polybenzoxazole 11 is worked up as in example 1. Yield: 246 g.

Example 12

Polybenzoxazole 12

84.01 g (0.3 mol) of bisaminophenol 4 are dissolved in 600 ml of Eaton's reagent. Added dropwise to this solution at room temperature with stirring is a solution of 72.61 g (0.3 mol) of dicarboxylic acid 5 in 600 ml of Eaton's reagent. The mixture is heated at 100° C. with stirring for 10 hours.

Polybenzoxazole 12 is worked up as in example 1. Yield: 145 g.

Example 13

Polybenzoxazole 13

84.63 g (0.15 mol) of bisaminophenol 1 are dissolved in 400 ml of Eaton's reagent. Added dropwise to this solution at room temperature with stirring is a solution of 20.64 g (0.08 mol) of dicarboxylic acid 1 and 12.24 g (0.04 mol) of dicarboxylic acid 2 in 300 ml of Eaton's reagent. The mixture is heated at 80° C. with stirring for 5 hours. At 40° C., 9.85 g (0.06 mol) of endcap 4 in solution in 80 ml of Eaton's reagent are added dropwise to the reaction mixture. The mixture is subsequently heated at 100° C. with stirring for 6 hours.

Polybenzoxazole 13 is worked up as in example 1. Yield: 114 g.

Example 14

Polyhydroxy Amide 14 [sic]

84.01 g (0.3 mol) of bisaminophenol 4 are dissolved in 700 ml of Eaton's reagent. Added dropwise to this solution at room temperature with stirring is a solution of 76.53 g (0.25 mol) of dicarboxylic acid 6 and 6.64 g (0.04 mol) of dicarboxylic acid 4 in 700 ml of Eaton's reagent. The mixture is heated at 100° C. with stirring for 10 hours.

Polybenzoxazole 14 is worked up as in example 1. Yield: 159 g.

Example 15

Polybenzoxazole 15

73.25 g (0.2 mol) of bisaminophenol 2 and 28.03 g (0.1 mol) of bisaminophenol 4 are dissolved in 800 ml of Eaton's reagent. Added dropwise to this solution at room temperature with stirring is a solution of 61.93 g (0.24 mol) of dicarboxylic acid 1 in 500 ml of Eaton's reagent. The mixture is heated at 80° C. with stirring for 5 hours. At 40° C., 11.77 g (0.12 mol) of endcap 5 in solution in 80 ml of Eaton's reagent are added dropwise to the reaction mixture. The mixture is subsequently heated at 100° C. with stirring for 6 hours.

Polybenzoxazole 15 is worked up as in example 1. Yield: 162 g.

Example 16

Polybenzoxazole 16

73.25 g (0.2 mol) of bisaminophenol 2 and 21.62 g (0.1 mol) of bisaminophenol 3 are dissolved in 900 ml of Eaton's reagent. Added dropwise to this solution at room temperature with stirring is a solution of 88.78 g (0.29 mol) of dicarboxylic acid 6 in 700 ml of Eaton's reagent. The mixture is heated at 100° C. with stirring for 10 hours.

Polybenzoxazole 16 is worked up as in example 1. Yield: 171 g.

Example 17

Polybenzoxazole 17

73.25 g (0.2 mol) of bisaminophenol 2 and 28.03 g (0.1 mol) of bisaminophenol 4 are dissolved in 900 ml of Eaton's reagent. Added dropwise to this solution at room temperature with stirring is a solution of 51.61 g (0.2 mol) of dicarboxylic acid 1 and 6.68 g (0.04 mol) of dicarboxylic acid 3 in 600 ml of Eaton's reagent. The mixture is heated at 80° C. with stirring for 5 hours. At 40° C., 11.77 g (0.12 mol) of endcap 5 in solution in 80 ml of Eaton's reagent are added dropwise to the reaction mixture. The mixture is then heated at 100° C. with stirring for 6 hours.

Polybenzoxazole 17 is worked up as in example 1. Yield: 158 g.

Example 18

Polybenzoxazole 18

73.25 g (0.2 mol) of bisaminophenol 2 and 28.03 g (0.1 mol) of bisaminophenol 4 are dissolved in 900 ml of Eaton's reagent. Added dropwise to this solution at room temperature with stirring is a solution of 76.5 g (0.25 mol) of dicarboxylic acid 2 and 8.88 g (0.04 mol) of dicarboxylic acid 7 in 800 ml of Eaton's reagent. The mixture is heated at 100° C. with stirring for 10 hours.

Polybenzoxazole 18 is worked up as in example 1. Yield: 171 g.

Example 19

Polybenzoxazole 19

54.94 g (0.15 mol) of bisaminophenol 2 and 42.04 g (0.15 mol) of bisaminophenol 4 are dissolved in 900 ml of Eaton's reagent. Added dropwise to this solution at room temperature with stirring is a solution of 24.9 g (0.15 mol) of dicarboxylic acid 4 and 45.92 g (0.15 mol) of dicarboxylic acid 6 in 700 ml of Eaton's reagent. The mixture is heated at 100° C. with stirring for 10 hours.

Polybenzoxazole 19 is worked up as in example 1. Yield: 158 g.

Example 20

Polybenzoxazole 20

84.69 g (0.15 mol) of bisaminophenol 1 are dissolved in 400 ml of Eaton's reagent. Added dropwise to this solution at room temperature with stirring is a solution of 25.83 g (0.3 mol) of endcap 1 in 100 ml of Eaton's reagent. The mixture is heated at 100° C. with stirring for 6 hours.

Polybenzoxazole 20 is worked up as in example 1. Yield: 85 g.

Example 21

Determination of the Thermal Stabilities

The polybenzoxazoles prepared exhibit thermal stabilities of >450° C. according to TGA (thermogravimetric analyses; instrument: STA 1500 from Rheometric Scientific, heating rate: 5K/min, inert gas: argon). The isothermal mass loss per hour at 400° C. for 10 hours is <0.7%.

Accordingly, the polybenzoxazoles prepared meet the requirements for the intended applications.

Example 22

Preparation of Polymer Solutions 20 g of the polybenzoxazoles prepared in examples 1 to 20 are dissolved in 80 g of distilled NMP (VLSI-Selectipur®). The dissolving operation takes place appropriately on a shaker apparatus at room temperature. The solution is then filtered under pressure through a 0.2 μm filter into a cleaned, particle-free, glass sample vessel. The viscosity of the polymer solution can be modified by varying the mass of polybenzoxazole dissolved.

Example 23

Preparation of Polymer Solutions with Addition of Crosslinkers

By using additional crosslinkers it is possible to exert a positive influence on the cure behavior, the strength, and the thermal and chemical stability of the polybenzoxazoles. As crosslinkers in this case it is possible preferably to use short-chain compounds containing at least two groups which are capable of addition polymerization or polycondensation (see below). These crosslinkers may be added to the polymer solution at from 0.5 to 5% by weight based on the polybenzoxazole.

Examples of Crosslinking Compounds

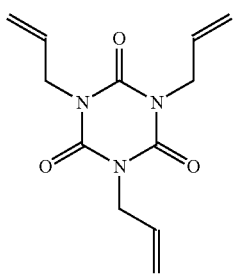
V1

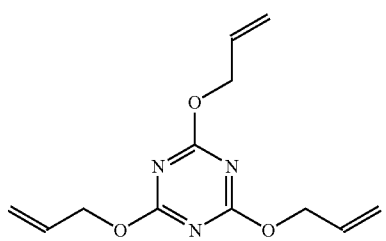
V2

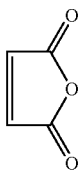
V3

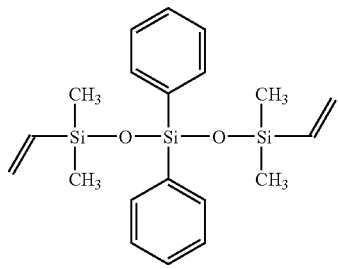
V4

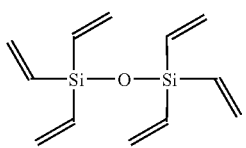
V5

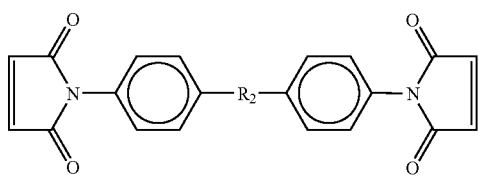
V6

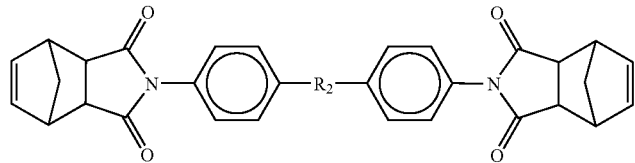
V7

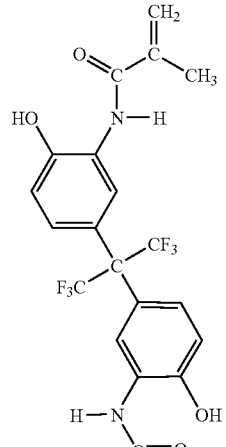
V8

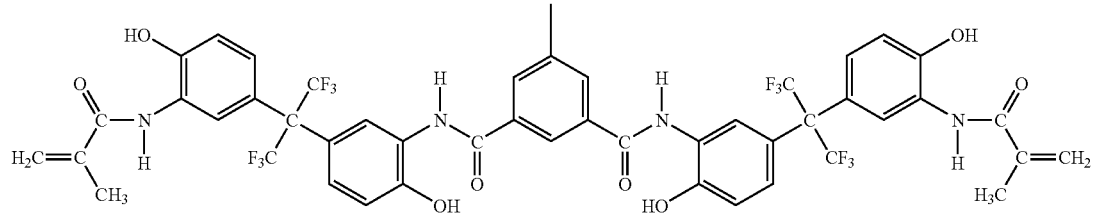

20 g of the polybenzoxazoles and 0.3 g of crosslinker prepared in examples 1 to 20 are dissolved in 80 g of distilled NMP (VLSI-Selectipur®). The dissolving operation takes place appropriately on a shaker apparatus at room temperature. The solution is then filtered under pressure through a 0.2 μm filter into a cleaned, particle-free, glass sample vessel. The viscosity of the polymer solution can be modified by varying the mass of polybenzoxazole dissolved.

Example 24

Preparation of Adhesion Promoter Solutions

By using adhesion promoters it is possible to enhance the wetting of the surface to be bonded and thus the adhesion of the polybenzoxazoles to surfaces relevant in microelectronics, such as silicon, silicon oxide, silicon nitride, tantalum nitride, glass or quartz, for example.

Examples of adhesion promoters which may be used include the following compounds:

HV1
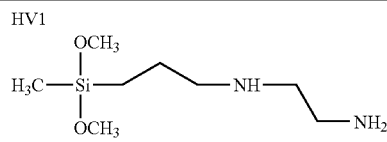

HV2
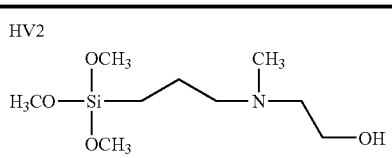

HV3
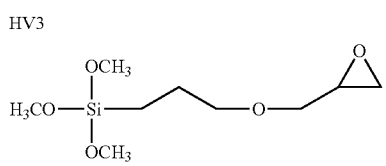

HV4
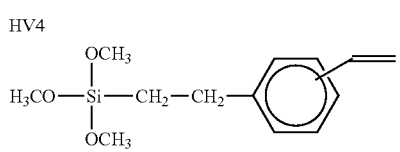

HV5
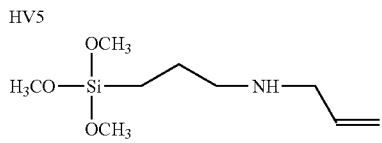

-continued

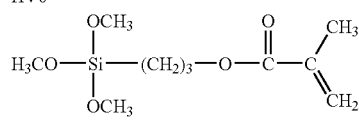
HV6

0.5 g of adhesion promoter (e.g., N-(2-aminoethyl)-3-amino-propylmethyldimethoxysilane) is dissolved in 95 g of methanol, ethanol or isopropanol (VLSI-Selectipur®) and 5 g of DI water in a cleaned, particle-free, glass sample vessel at room temperature. After standing at room temperature for 24 hours, the adhesion promoter solution is ready for use. This solution can be used for a maximum of 3 weeks.

Example 25

Improvement to the Adhesion by Roughening of the Surface to be Bonded

In order to remove oxide layers in the case of metals and/or to roughen the surface it is advantageous to carry out a mechanical abrasion process, brushing and/or sandblasting. The surfaces to be bonded are therefore treated with an abrasive. The removal of dust residues can be accomplished by blowing with compressed air or washing in water.

Example 26

Cleaning of the Surfaces to be Bonded

In order to remove residues of oil and fats or other impurities, the components to be bonded may be treated with solvents such as acetone, alcohols, halogenated hydrocarbons or aromatic hydrocarbons. The component can be cleaned by rubbing down with lint-free materials, dipping in the solvent at room temperature or an elevated temperature, or in an ultrasound bath.

Cleaning may also be accomplished by means of plasma or flaming. In that case the component to be bonded is held in a plasma flow or in a flame for a short period of about 1 minute.

Example 27

Application of the Adhesion Promoter

The adhesion promoter should produce a monomolecular layer on the surface of the parts to be bonded. The adhesion promoter can be applied appropriately by spincoating. For that purpose the adhesion promoter solution of example 23 is applied to the area to be bonded, through a 0.2 μm primary filter, and spun at 5,000 rpm for 30 s. This is followed by a drying step at 100° C. for 60 s. Another possibility for applying the adhesion promoter is to dip the area to be bonded in the adhesion promoter solution and then blow the area dry. The areas thus treated should be adhesively bonded within 2 hours.

Example 28

Application of the Adhesive as a Powder

The polybenzoxazoles prepared according to examples 1 to 20 are dried and then comminuted in a mortar or in a powder mill. The adhesive powder obtained in this way is spread uniformly over a surface of the parts to be bonded which have been pretreated according to examples 25 and 26, possibly also according to example 27, by tipping and spreading, for example. By heating of the component at 250° C. to 350° C., the adhesive powder can be converted, in the case of short-chain polybenzoxazoles into a homogeneous melt.

Example 29

Application of the Adhesive as a Solution by Spincoating

The adhesive solution prepared according to example 22 is applied by syringe to the surface to be bonded which has been pretreated according to examples 25 and 26, possibly also according to example 27 and is uniformly distributed using a spincoater. The rotary speed of the spincoater determines the layer thickness of the adhesive. Customary conditions are 30 s at 1,000 rpm to 3,500 rpm. For removing the solvent, this is followed by a drying step at 200° C. for 4 minutes on a hotplate or in an oven.

Example 30

Application of the Adhesive as a Solution by Spraying

The adhesive solution prepared according to example 22 is applied uniformly by means of spraying equipment (e.g., spraygun) to the surface which is to be bonded and has been pretreated according to examples 25 and 26, and possibly also according to example 27. For removing the solvent, this is followed by a drying step at 200° C. for 4 minutes on a hotplate or in an oven.

Example 31

Application of the Adhesive as a Solution by Brushing

The adhesive solution prepared according to example 22 is applied uniformly by brushing to the surface to be bonded. The brush should be made from a material which cannot be damaged by NMP. For removing the solvent, this is followed by a drying step at 200° C. for 4 minutes on a hotplate or in an oven.

Example 32

Adhesive Bonding

The components prepared in accordance with the following examples are brought together on a hotplate at a temperature of 250° C. and bonded at this temperature for 2 minutes with a pressing force of 4 N/cm².

| | |
|---|---|
| Temperature range, general: | 250° C. to 350° C. |
| Range for bonding time: | 0.5 min to 20 min |
| Range for pressing force: | 0.5 to 20 N/cm² |

After this, an option is to carry out a baking step at from 300° C. to 420° C. in an oven for 1 h.

Example 33

Bonding of Titanium Nitride and Determination of the Adhesion

A 4" silicon wafer cleaned according to example 26 is sputtered with a titanium nitride layer 50 nm thick. Applied to this wafer by spincoating is the adhesive solution of a polybenzoxazole, prepared in accordance with example 21, at 500 rpm for 5 s and at 3,500 rpm for 25 s. Following a short softbake at 120° C. for 1 min and at 200° C. for 2 min on a hotplate, 10 silicon chips measuring 4×4 mm², likewise cleaned beforehand in accordance with example 25 and sputtered on the surface with 50 nm titanium nitride, are pressed onto the polybenzoxazole film at a temperature of 340° C. with a force of 2N. This stack is then heat-treated at 400° C. in an oven, in a nitrogen atmosphere, for 1 h. After cooling to room temperature, an adhesion test is carried out by means of a shear tester, Dage Series 400.

The list below shows the polymer used in the first column.
Column 2 shows the shear force measured.
Column 3 shows surface treatment of the components to be bonded (L=solvent; M=mech. abrasion; B=flaming; PL=plasma)
Column 4 shows whether and, if so, which adhesion promoter was used.
Column 5 shows the type of bonding (S=spincoating; T=dipping; P=brushing; SP=spraying; PU=powder melting)
Column 6 shows whether and, if so, which crosslinker was added.

Average shear force measured:

| | | | | | |
|---|---|---|---|---|---|
| Polybenzoxazole 1 | 19.03 N/mm² | L | HV1 | S | — |
| Polybenzoxazole 2 | 20.16 N/mm² | L | HV1 | S | — |
| Polybenzoxazole 3 | 17.94 N/mm² | PL | — | S | — |
| Polybenzoxazole 4 | 20.67 N/mm² | L | HV2 | SP | V1 |
| Polybenzoxazole 5 | 18.69 N/mm² | L | HV3 | S | V2 |

Example 34

Bonding of Tantalum Nitride and Determination of the Adhesion

Experiment carried out exactly the same as for titanium nitride (example 33), with the difference that, here, the surface of the wafer and of the chips consisted not of titanium nitride but instead of tantalum nitride.

Average shear force measured:

| | | | | | |
|---|---|---|---|---|---|
| Polybenzoxazole 6 | 17.03 N/mm² | L | HV1 | S | V2 |
| Polybenzoxazole 7 | 20.12 N/mm² | L | HV1 | S | V4 |
| Polybenzoxazole 8 | 18.47 N/mm² | L | HV1 | S | — |
| Polybenzoxazole 9 | 19.13 N/mm² | PL | — | P | V3 |
| Polybenzoxazole 10 | 17.26 N/mm² | L | — | SP | — |

Example 35

Bonding of Silicon and Determination of the Adhesion

Experiment carried out exactly the same as for titanium nitride (example 33), with the difference that, here, the surface of the wafer and of the chips consisted not of titanium nitride but instead of silicon.

Average shear force measured:

| | | | | | |
|---|---|---|---|---|---|
| Polybenzoxazole 11 | 20.39 N/mm² | PL | HV2 | S | — |
| Polybenzoxazole 12 | 20.15 N/mm² | PL | HV3 | SP | — |
| Polybenzoxazole 13 | 19.38 N/mm² | L | HV4 | S | V3 |
| Polybenzoxazole 14 | 18.48 N/mm² | L | HV1 | S | V3 |
| Polybenzoxazole 15 | 20.74 N/mm² | L | — | P | V5 |

Example 36

Bonding of Glass and Determination of the Adhesion

Experiment carried out exactly the same as in example 33, with the difference that here, a glass wafer and 4×4 mm glass chips were used.

Average shear force measured:

| | | | | | |
|---|---|---|---|---|---|
| Polybenzoxazole 16 | 18.25 N/mm² | L | HV1 | S | V5 |
| Polybenzoxazole 17 | 19.31 N/mm² | PL | HV2 | SP | V6 |
| Polybenzoxazole 18 | 18.02 N/mm² | PL | HV5 | S | — |
| Polybenzoxazole 19 | 17.38 N/mm² | L | HV6 | T | — |
| Polybenzoxazole 1 | 19.73 N/mm² | L | — | SP | V7 |

Example 37

Bonding of Quartz Glass and Determination of the Adhesion

Experiment carried out exactly the same as in example 33, with the difference that here, a quartz wafer and 4×4 mm quartz chips were used.

Average shear force measured:

| | | | | | |
|---|---|---|---|---|---|
| Polybenzoxazole 16 | 18.35 N/mm² | L | HV2 | S | V8 |
| Polybenzoxazole 17 | 19.16 N/mm² | L | HV1 | T | — |
| Polybenzoxazole 18 | 17.83 N/mm² | PL | — | T | V2 |
| Polybenzoxazole 19 | 17.39 N/mm² | PL | HV4 | PU | V4 |
| Polybenzoxazole 1 | 19.56 N/mm² | PL | — | P | — |

Example 38

Bonding of Copper and Determination of the Adhesion

Experiment carried out exactly the same as in example 33, with the difference that here, copper plates and 4×4 mm copper chips were used.

Average shear force measured:

| | | | | | |
|---|---|---|---|---|---|
| Polybenzoxazole 1 | 21.28 N/mm² | M | — | P | V1 |
| Polybenzoxazole 3 | 20.06 N/mm² | B | HV1 | PU | V5 |
| Polybenzoxazole 9 | 20.21 N/mm² | L | HV3 | P | V3 |
| Polybenzoxazole 12 | 21.51 N/mm² | M | — | SP | V5 |
| Polybenzoxazole 15 | 19.79 N/mm² | M | — | S | — |

Example 39

Bonding of Brass and Determination of the Adhesion

Experiment carried out exactly the same as in example 33, with the difference that here, brass plates and 4×4 mm brass chips were used.

Average shear force measured:

| | | | | | |
|---|---|---|---|---|---|
| Polybenzoxazole 2 | 20.16 N/mm² | B | HV1 | S | V5 |
| Polybenzoxazole 4 | 20.39 N/mm² | M | HV4 | S | V3 |
| Polybenzoxazole 7 | 19.03 N/mm² | M | — | SP | — |
| Polybenzoxazole 11 | 20.75 N/mm² | L | — | P | V1 |
| Polybenzoxazole 16 | 19.94 N/mm² | L | HV3 | T | — |

Example 40

Bonding of Steel and Determination of the Adhesion

Experiment carried out exactly the same as in example 33, with the difference that here, steel plates and 4×4 mm steel chips were used.

Average shear force measured:

| | | | | | |
|---|---|---|---|---|---|
| Polybenzoxazole 3 | 17.16 N/mm² | B | HV3 | S | — |
| Polybenzoxazole 7 | 18.66 N/mm² | M | HV4 | SP | V5 |
| Polybenzoxazole 8 | 17.15 N/mm² | M | — | SP | — |
| Polybenzoxazole 12 | 17.31 N/mm² | B | — | T | — |
| Polybenzoxazole 18 | 19.29 N/mm² | L | HV1 | S | V7 |

Example 41

Bonding of Aluminum and Determination of the Adhesion

Experiment carried out exactly the same as in example 33, with the difference that here, aluminum plates and 4×4 mm aluminum chips were used.

Average shear force measured:

| | | | | | |
|---|---|---|---|---|---|
| Polybenzoxazole 1 | 18.04 N/mm² | M | HV3 | S | V8 |
| Polybenzoxazole 4 | 17.13 N/mm² | L | HV1 | T | V6 |
| Polybenzoxazole 9 | 16.04 N/mm² | M | — | S | — |
| Polybenzoxazole 11 | 18.27 N/mm² | M | — | PU | V4 |
| Polybenzoxazole 15 | 18.01 N/mm² | L | — | P | V3 |

Example 42

Bonding of Ceramic and Determination of the Adhesion

Experiment carried out exactly the same as in example 33, with the difference that here, ceramic plates and 4×4 mm ceramic chips were used.

Average shear force measured:

| | | | | | |
|---|---|---|---|---|---|
| Polyhydroxy amide 1 | 22.07 N/mm² | L | HV4 | T | V2 |
| Polyhydroxy amide 2 | 21.31 N/mm² | PL | HV3 | S | V6 |
| Polyhydroxy amide 17 | 20.71 N/mm² | PL | HV5 | P | — |
| Polyhydroxy amide 18 | 20.56 N/mm² | L | — | S | — |
| Polyhydroxy amide 19 | 19.43 N/mm² | B | — | PU | — |
| Polybenzoxazole 1 | 21.09 N/mm² | L | HV3 | T | V1 |
| Polybenzoxazole 4 | 20.42 N/mm² | PL | HV1 | S | V8 |
| Polybenzoxazole 11 | 19.95 N/mm² | PL | — | S | V4 |
| Polybenzoxazole 14 | 19.55 N/mm² | PL | HV2 | P | — |
| Polybenzoxazole 15 | 19.18 N/mm² | B | — | T | — |

Example 43

Bonding of Marble and Determination of the Adhesion

Experiment carried out exactly the same as in example 33, with the difference that here, marble plates and 4×4 mm marble platelets were used.

Average shear force measured:

| | | | | | |
|---|---|---|---|---|---|
| Polybenzoxazole 4 | 21.26 N/mm² | B | HV3 | P | V5 |
| Polybenzoxazole 5 | 23.41 N/mm² | M | HV5 | P | V8 |
| Polybenzoxazole 8 | 22.21 N/mm² | B | HV2 | T | V7 |
| Polybenzoxazole 10 | 21.63 N/mm² | M | — | P | V2 |
| Polybenzoxazole 13 | 20.43 N/mm² | M | — | T | — |

Example 44

Bonding of Granite and Determination of the Adhesion

Experiment carried out exactly the same as in example 33, with the difference that here, granite and 4×4 mm granite fragments were used.

Average shear force measured:

| | | | | | |
|---|---|---|---|---|---|
| Polybenzoxazole 2 | 21.22 N/mm² | B | HV2 | P | V6 |
| Polybenzoxazole 5 | 19.84 N/mm² | M | — | PU | — |
| Polybenzoxazole 9 | 20.24 N/mm² | L | HV3 | P | V2 |
| Polybenzoxazole 13 | 20.13 N/mm² | L | HV2 | T | V1 |
| Polybenzoxazole 17 | 19.09 N/mm² | M | — | P | — |

Example 45

Bonding of Silicon Carbide and Determination of the Adhesion

Experiment carried out exactly the same as in example 33, with the difference that here, silicon carbide wafers and 4×4 mm silicon carbide chips were used.

Average shear force measured:

| | | | | | |
|---|---|---|---|---|---|
| Polybenzoxazole 6 | 17.03 N/mm² | L | — | S | — |
| Polybenzoxazole 7 | 17.07 N/mm² | L | — | S | V4 |
| Polybenzoxazole 9 | 18.71 N/mm² | L | HV1 | S | V8 |
| Polybenzoxazole 10 | 18.16 N/mm² | L | HV2 | T | V5 |
| Polybenzoxazole 13 | 17.09 N/mm² | L | HV5 | T | — |

Example 46

Bonding of Silicon with Copper and Determination of the Adhesion

Experiment carried out exactly the same as in example 33, with the difference that here, silicon wafers and 4×4 mm copper fragments were used.

Average shear force measured:

| | | | | | |
|---|---|---|---|---|---|
| Polybenzoxazole 1 | 17.58 N/mm² | L | — | S | — |
| Polybenzoxazole 3 | 18.15 N/mm² | L | HV1 | S | V1 |
| Polybenzoxazole 4 | 17.37 N/mm² | M | — | SP | V2 |
| Polybenzoxazole 11 | 17.19 N/mm² | M | — | S | — |
| Polybenzoxazole 13 | 18.34 N/mm² | B | HV4 | P | V3 |

Example 47

Bonding of Silicon with Ceramic and Determination of the Adhesion

Experiment carried out exactly the same as in example 33, with the difference that here, silicon wafers and 4×4 mm ceramic chips were used.

Average shear force measured:

| | | | | | |
|---|---|---|---|---|---|
| Polybenzoxazole 2 | 19.27 N/mm² | L | HV2 | S | V4 |
| Polybenzoxazole 6 | 19.53 N/mm² | PL | HV4 | S | V2 |
| Polybenzoxazole 8 | 18.84 N/mm² | PL | HV1 | SP | V1 |
| Polybenzoxazole 12 | 17.79 N/mm² | L | — | T | V6 |
| Polybenzoxazole 14 | 17.61 N/mm² | L | — | T | — |

Example 48

Bonding of Silicon with Glass and Determination of the Adhesion

Experiment carried out exactly the same as in example 33, with the difference that here, silicon wafers and 4×4 mm glass chips were used.

Average shear force measured:

| | | | | | |
|---|---|---|---|---|---|
| Polybenzoxazole 2 | 18.47 N/mm² | L | HV1 | S | V3 |
| Polybenzoxazole 5 | 18.82 N/mm² | PL | HV3 | S | V2 |
| Polybenzoxazole 7 | 17.71 N/mm² | L | HV2 | SP | V6 |
| Polybenzoxazole 15 | 17.28 N/mm² | PL | HV4 | T | — |
| Polybenzoxazole 16 | 18.31 N/mm² | L | — | T | — |

Example 49

Bonding of Aluminum with Glass and Determination of the Adhesion

Experiment carried out exactly the same as in example 33, with the difference that here, aluminum wafers and 4×4 mm glass chips were used.

Average shear force measured:

| | | | | | |
|---|---|---|---|---|---|
| Polybenzoxazole 4 | 17.26 N/mm² | L | — | P | — |
| Polybenzoxazole 5 | 19.06 N/mm² | L | HV3 | S | V6 |
| Polybenzoxazole 9 | 16.96 N/mm² | M | — | T | — |
| Polybenzoxazole 17 | 19.17 N/mm² | L | HV2 | S | V3 |
| Polybenzoxazole 19 | 18.63 N/mm² | M | HV1 | S | V5 |

Example 50

Bonding of Steel and Glass and Determination of the Adhesion

Experiment carried out exactly the same as in example 33, with the difference that here, steel plates and 4×4 mm glass chips were used.

Average shear force measured:

| | | | | | |
|---|---|---|---|---|---|
| Polybenzoxazole 1 | 16.27 N/mm² | L | — | S | V1 |
| Polybenzoxazole 4 | 16.79 N/mm² | L | HV1 | P | V1 |
| Polybenzoxazole 8 | 16.15 N/mm² | M | HV5 | SP | V5 |
| Polybenzoxazole 16 | 17.21 N/mm² | M | HV6 | S | — |
| Polybenzoxazole 18 | 16.79 N/mm² | L | — | S | V2 |

Example 51

Bonding of Granite with Glass and Determination of the Adhesion

Experiment carried out exactly the same as in example 33, with the difference that here, granite and 4×4 mm glass chips were used.

Average shear force measured:

| | | | | | |
|---|---|---|---|---|---|
| Polybenzoxazole 2 | 16.01 N/mm² | PL | — | PU | — |
| Polybenzoxazole 3 | 17.42 N/mm² | PL | HV1 | S | V2 |
| Polybenzoxazole 5 | 17.52 N/mm² | L | HV4 | S | V7 |
| Polybenzoxazole 10 | 16.31 N/mm² | L | HV3 | T | V2 |
| Polybenzoxazole 14 | 16.83 N/mm² | L | HV6 | T | V8 |

Example 52

Bonding of Copper with Aluminum and Determination of the Adhesion

Experiment carried out exactly the same as in example 33, with the difference that here, copper plates and 4×4 mm aluminum fragments were used.

Average shear force measured:

| | | | | | |
|---|---|---|---|---|---|
| Polybenzoxazole 3 | 19.66 N/mm² | M | HV3 | S | V5 |
| Polybenzoxazole 5 | 19.41 N/mm² | M | HV1 | S | V6 |
| Polybenzoxazole 8 | 20.02 N/mm² | L | HV2 | SP | V8 |
| Polybenzoxazole 10 | 18.14 N/mm² | L | — | T | V7 |
| Polybenzoxazole 17 | 17.68 N/mm² | M | — | S | — |

Example 53

Comparative Example, Adhesion

The polyimide PIMEL G-7636C from Asahi Kasei was dissolved in NMP as in example 22 and bonded as in example 33. Using the shear tester from Dage, Series 4000, the following average adhesion values were measured:

| | |
|---|---|
| Titanium nitride surface: | 13.26 N/mm² |
| Tantalum nitride surface: | 14.61 N/mm² |
| Silicon surface: | 14.31 N/mm² |
| Glass surface: | 12.18 N/mm² |

| Copper surface: | 13.52 N/mm² |
| Steel surface: | 10.38 N/mm² |
| Ceramic surface: | 13.03 N/mm² |

Example 54

Determination of the Stability to Organic Solvents

The adhesive bonds produced in accordance with examples 33 to 52 were heated at 40° C. in acetone for 3 h, at 40° C. in chloroform for 3 h, at 60° C. in toluene for 3 h, and at 80° C. in NMP for 3 h. The wafer was then washed with DI water. The wafer was dried in vacuo at 200° C. for 60 minutes and the adhesion was determined using the shear tester from Dage, Series 4000. The bonded examples 33 to 52 showed no signs of detachment. According to this test, the bond strength remained unchanged.

Example 55

Determination of the Stability to Acids

The components produced in accordance with examples 33 to 36, 42, 45, 47, and 48 were stored in concentrated hydrochloric acid at room temperature (25° C.) for 5 h and in 50% strength sulfuric acid at 60° C. for 5 h. The bond was then washed with DI water. The bond was dried in vacuo at 200° C. for 60 minutes and the adhesion was determined by means of the shear tester from Dage, Series 4000. The bonded parts showed no signs of detachment. The bond strength remained unchanged.

Example 56

Determination of the Stability to Bases

The bonds produced in accordance with examples 33, 34, 38 to 40 and 42 to 45 were stored in concentrated potassium hydroxide solution at 40° C. for 24 h and in concentrated ammonia solution at RT for 24 h. The bond was then washed with DI water. The bond was dried in vacuo at 200° C. for 60 minutes and the adhesion was determined by means of the shear tester from Dage, Series 4000. The bonded parts showed signs [sic] of detachment. The bond strength remained unchanged.
Signs of detachment. The bond strength remained unchanged.
[sic]

Example 57

Determination of the Water Absorption

A bond produced in accordance with examples 33 to 52 with a known mass of adhesive, polybenzoxazole 1, was weighed with a DeltaRange AT261 analytical balance and then stored in water at 80° C. for 10 h. After a short drying step of 15 minutes at 50° C. in a drying cabinet, the weight was determined again. The percentage water absorption, based on the mass of adhesive, was calculated from the difference in mass.
Water absorption determined:
Example 33: 0.4%
Example 34: 0.6%
Example 35: 0.4%
Example 42: 0.6%
Example 44: 0.5%
Example 48: 0.3%
Comparative example 53: 4.1%

Example 58

Determination of the Adhesion After Thermal Exposure Testing

The bonds produced in accordance with examples 33 to 52 were heated in an oven at 450° C. under nitrogen for 1 hour. After cooling, the shear test was carried out in each case. The bond strength remained unchanged.

Example 59

Determination of the Adhesion After Climatic Testing

A [sic] bonds produced in accordance with examples 33 to 52 were thermally exposed in a Vötsch VT7004 climate cabinet between −50° C. and 150° C. for 500 cycles. Following this treatment, a shear test was carried out in each case. The bond strength remained unchanged.

Example 60

Determination of the Adhesion at 250° C.

The adhesion of a bond produced in accordance with examples 33 to 52 using polybenzoxazole 1 was tested on a shear tester from Dage, Series 4000 with hotplate, at 250° C.
Average adhesion values:
Example 33: 16.41 N/mm²
Example 35: 15.62 N/mm²
Example 38: 15.04 N/mm²
Example 42: 16.16 N/mm²
Example 45: 16.41 N/mm²
Example 51: 15.88 N/mm²
Comparative example 53: 9.72 N/mm² (surface ceramic)

The invention claimed is:
1. A process for adhesively bonding materials or components, comprising:
a. providing polybenzoxazoles (PBOs) of formula (I):

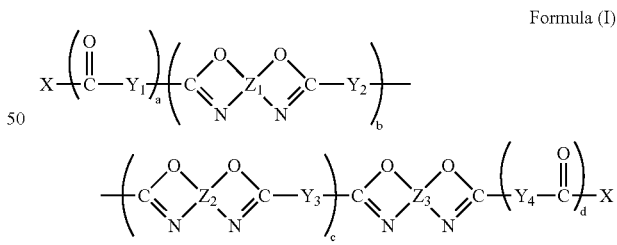

Formula (I)

where a=0 or 1, b=0–100, c=0–100 and d=0 or 1, where a=d;
X, if a and d=0, is: —H, alkyl, alkenyl, cycloalkenyl, aryl, aralkyl, aralkenyl, aralkynyl or heterocycloalkyl each unsubstituted or substituted;
X, if a and d=1, is: hydroxy, substituted or unsubstituted alkoxy, alkenoxy, aryloxy, cycloalkenoxy, amino, alkylamino, alkenylamino, arylamino, arylalkenoxy, arylalkylamino;
$Y_1$ to $Y_4$ independently of one another have the following definition: substituted or unsubstituted aryl, a substituted or unsubstituted polynuclear aromatic hydrocarbon compound, a substituted or unsubstituted fused ring system, or alkyl, alkenyl, alkynyl, aralkyl, aralkenyl, aralkynyl, heterocyclo or cycloalkenyl each unsubstituted or substituted;

$Z_1$ to $Z_3$ independently of one another have the following definition: aryl, aralkyl, aralkenyl, aralkynyl, heteroaryl, a polynuclear aromatic hydrocarbon compound or a fused ring system each unsubstituted or substituted;

b. applying the PBOs to the area or areas of the materials or components to be bonded;

c. contacting the areas to be bonded with one another;

d. subsequently crosslinking the PBOs; and e. adhesively bonding the materials or components through the cross-linking of step (d).

2. The process according to claim 1, characterized in that b=1–20.

3. The process according to claim 1, characterized in that c=0–20, preferably c=1–15.

4. The process according to claim 1, characterized in that X, if a and d=0, is:

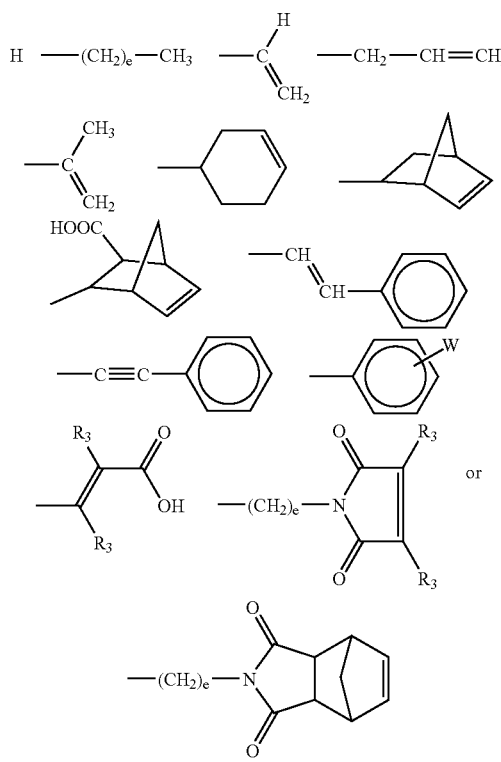

where e=0–10;
$R_3$ is: —H , and also:

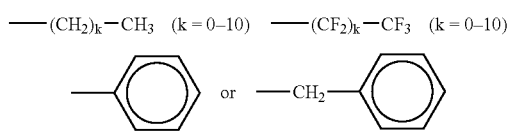

W is:

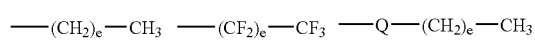
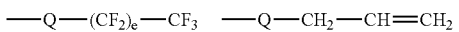
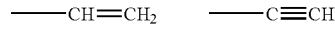
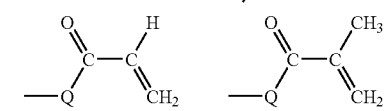
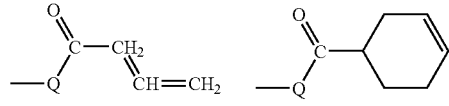
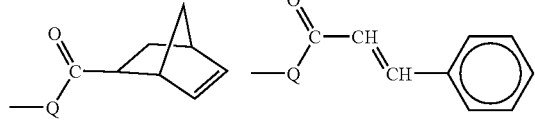
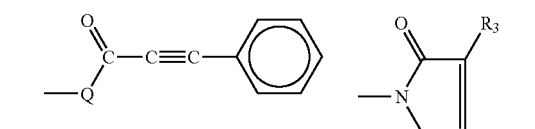

or

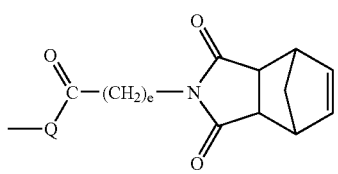

where e=0–10;
and Q is: —O—, —S— or —NH—.

5. The process according to claim 1, characterized in that X, if a and d=1, is:

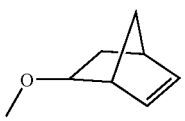
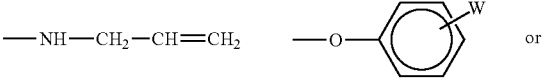
 or

-continued
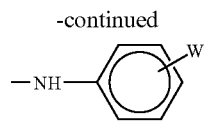
where e=0–10;
and W is as defined in claim 4.
6. The process according to claim 1, characterized in that $Y_1$ to $Y_4$ independently of one another are:
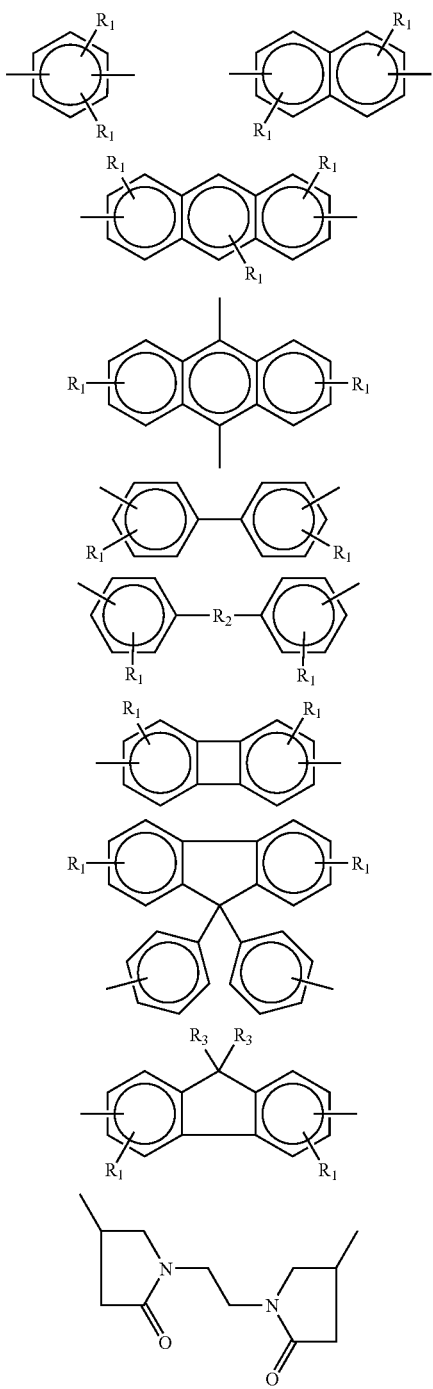
-continued
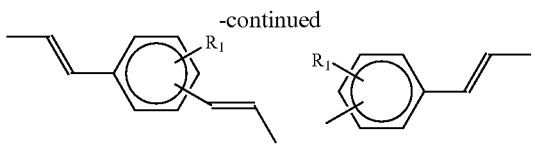
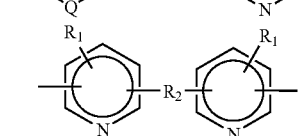
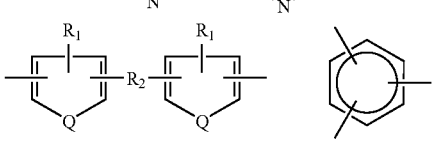
—(CH$_2$)$_x$—R$_2$—(CH$_2$)$_x$—
where x = 1–10; if R$_2$ =
—CH$_2$—, then x = 0–10
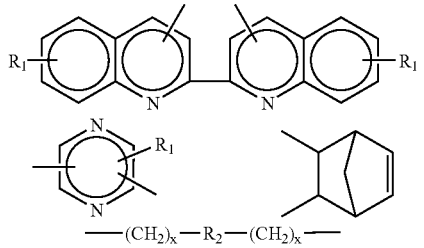
or
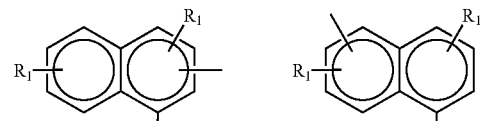
where Q is: —O—, —S— or —NH—;
$R_1$ is: —H, —CF$_3$, —OH, —SH, —COOH, —N(R$_4$)$_2$, alkyl, aryl, heteroaryl, and also:
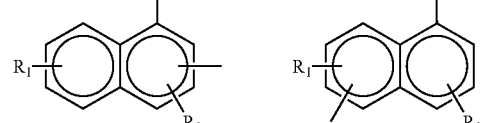
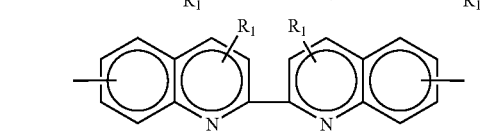
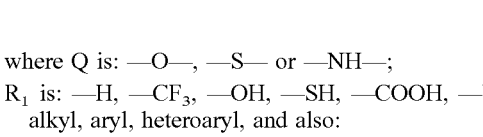
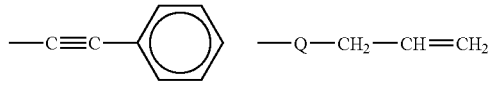
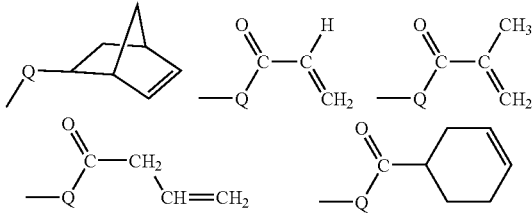

-continued
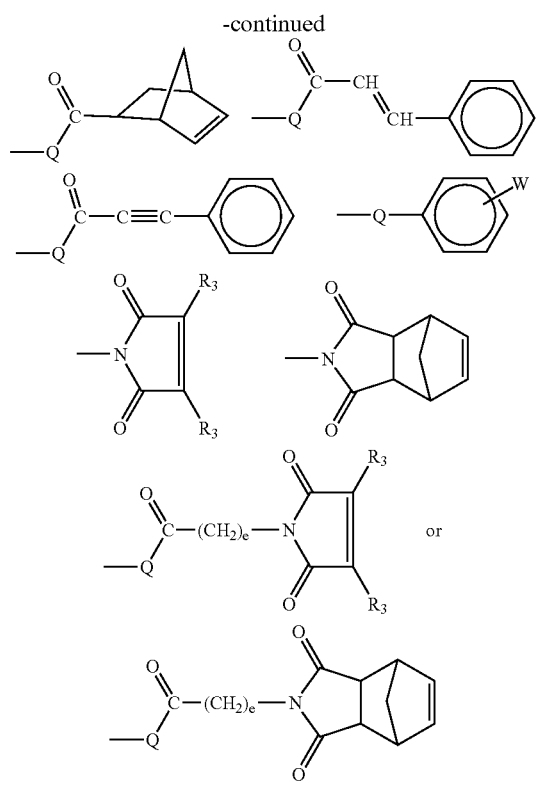
where Q is: —O—, —S— or —NH—;
R$_2$ is: —O—, —CO—, —NR$_3$—, —S—, —SO$_2$—, —S$_2$—, —CH$_2$—, or:
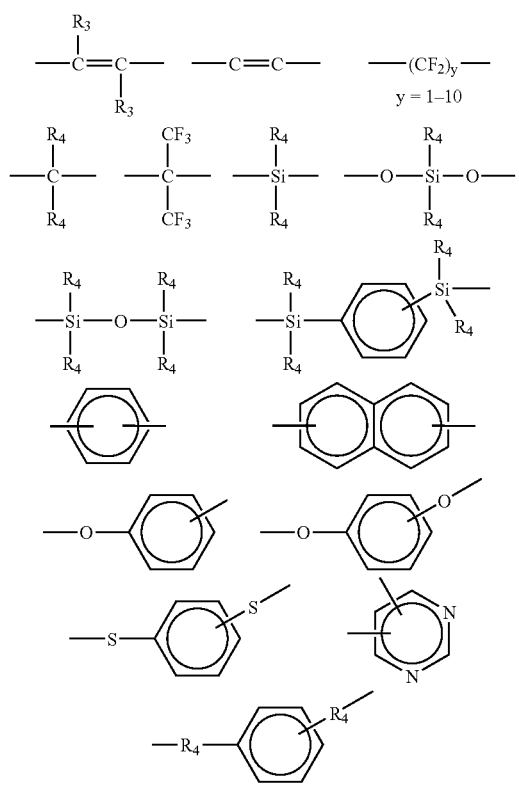
-continued
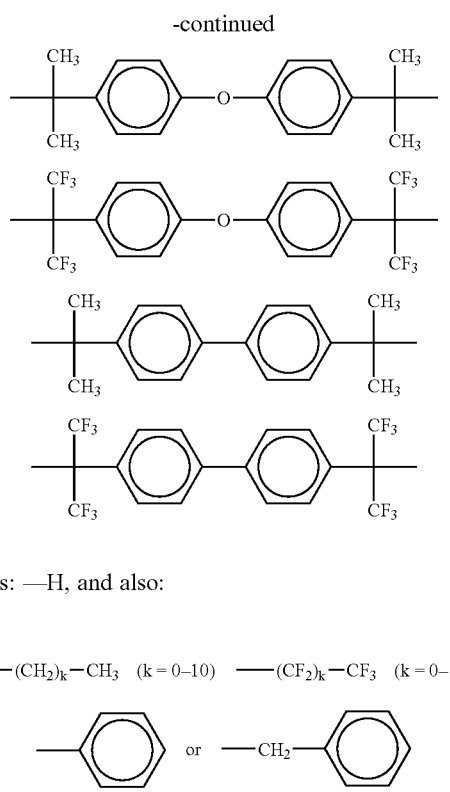
R$_3$ is: —H, and also:
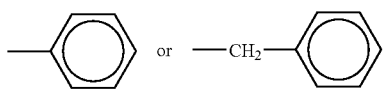
and R$_4$ is: alkyl having from 1 to 10 carbon atoms, aryl or heteroaryl.
7. The process according to claim 1, characterized in that Z$_1$ to Z$_3$, independently of one another, are:
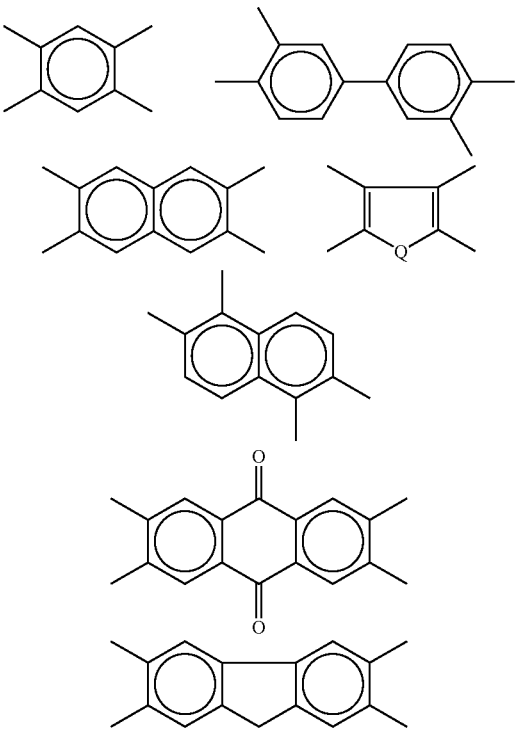

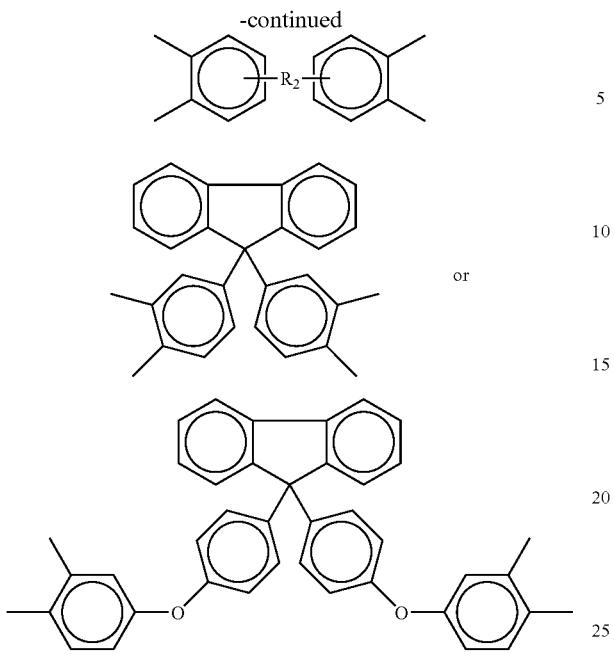

where Q is: —O—, —S— or —NH—;
and $R_2$ is as defined in claim 6.

8. The process according to claim 1 for adhesively bonding the following materials and/or components made of the materials: aluminum, titanium, vanadium, chromium, manganese, iron, cobalt, nickel, copper, zinc, steel, brass, palladium, silver, tin, tantalum, tungsten, platinum, gold, lead, carbon, including layers containing carbon and deposited by means of plasma, carbon fibers, silicon or germanium, and/or alloys or compounds of these materials such as silicon carbide, silicon nitride, silicon oxide, titanium nitride, tantalum nitride, silicon oxynitride, tungsten nitride, gallium arsenide, gallium nitride, gallium indium phosphite, indium-tin oxide and/or glasses, ceramics, glass ceramics, clayware, porcelain, stoneware and/or silicates.

9. The process according to claim 1 for adhesively bonding components or materials used in microelectronics and optoelectronics.

10. The process according to claim 1 for adhesively bonding chips and/or wafers.

11. The process according to claim 1 for adhesively bonding ceramics, glass ceramics, glasses, clayware, porcelain, stoneware and/or silicates or minerals, such as marble, basalt, limestone, granite and/or concrete.

12. The process according to claim 1, characterized in that the crosslinking of the polybenzoxazoles is carried out by means of temperature treatment, laser treatment, ultrasound or microwave treatment.

13. The process according to claim 1, characterized in that the polybenzoxazoles are applied in the form of a powder and the powder is converted by heating into a melt.

14. The process according to claim 1, characterized in that the polybenzoxazoles are present in the form of a melt and are applied by spincoating, spraying or spreading and/or brushing.

15. The process according to claim 1, characterized in that prior to the application of the polybenzoxazoles the areas to be bonded are roughened and/or cleaned.

16. The process according to claim 1, characterized in that silanes containing at least one alkoxy group, preferably one or more of the following compounds, is used as adhesion promoters:

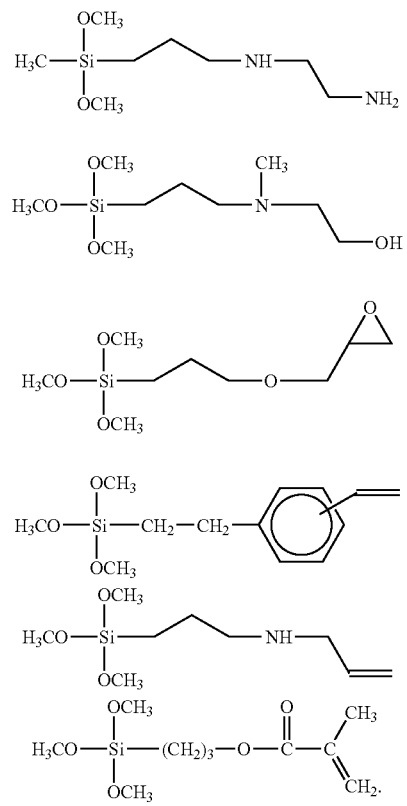

17. The process according to claim 1, characterized in that the bonded components are chips and/or wafers.

18. The process of claim 1, further comprising baking the materials or components to which the PBOs have been applied.

19. The process according to claim 1, characterized in that the polybenzoxazoles are in the form of a solution in an organic solvent and are applied by spincoating, spraying or spreading and/or brushing.

20. The process according to claim 1, characterized in that prior to the application of the polybenzoxazole an adhesion promoter is applied to at least one area to be bonded.

21. The process according to claim 19, characterized in that N-methylpyrrolidone, γ-butyrolactone, ethyl lactate, cyclohexanone or diethylene glycol monomethyl ether are used as organic solvents.

22. The process according to claim 19, characterized in that in the solution of PBO and of organic solvent 0.1–10% by weight, preferably 0.5–5% by weight, based on the overall composition, of a crosslinker are present.

23. The process according to claim 20, characterized in that the adhesion promoter is applied to one of the areas to be bonded and the polybenzoxazole is applied to the other area.

24. A process for adhesively bonding at least a first component and a second component, comprising:
   a. providing a first component and a second component;
   b. providing polybenzoxazoles (PBOs) of formula (I):

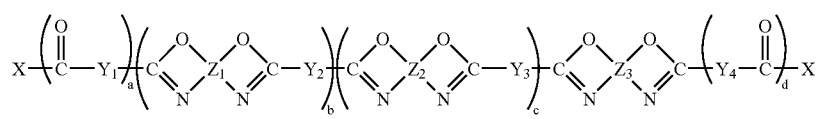

Formula (I)

where a=0 or 1, b=0–100, c=0–100 and d=0 or 1, where a=d;

X, if a and d=0, is: —H, alkyl, alkenyl, cycloalkenyl, aryl, aralkyl, aralkenyl, aralkynyl or heterocycloalkyl each unsubstituted or substituted;

X, if a and d=1, is: hydroxy, substituted or unsubstituted alkoxy, alkenoxy, aryloxy, cycloalkenoxy, amino, alkylamino, alkenylamino, arylamino, arylalkenoxy, arylalkylamino;

$Y_1$ to $Y_4$ independently of one another have the following definition: substituted or unsubstituted aryl, a substituted or unsubstituted polynuclear aromatic hydrocarbon compound, a substituted or unsubstituted fused ring system, or alkyl, alkenyl, alkynyl, aralkyl, aralkenyl, aralkynyl, heterocyclo or cycloalkenyl each unsubstituted or substituted;

$Z_1$ to $Z_3$ independently of one another have the following definition: aryl, aralkyl, aralkenyl, aralkynyl, heteroaryl, a polynuclear aromatic hydrocarbon compound or a fused ring system each unsubstituted or substituted;

c. applying the PBOs to an area or areas of at least one of the first component and the second component to be bonded;

d. contacting the areas to be bonded with one another;

e. subsequently crosslinking the PBOs; and f. adhesively bonding the first component and the second component through the cross-linking of step (e).

* * * * *